(12) United States Patent
Olson et al.

(10) Patent No.: US 7,799,235 B2
(45) Date of Patent: Sep. 21, 2010

(54) FLUID FILTER SYSTEM AND RELATED METHOD

(75) Inventors: Norman L. Olson, Port Orchard, WA (US); Brian R. McLaughlin, Portland, ME (US); Daniel P. Cobb, Portland, ME (US); Vaikko P. Allen, II, Portland, ME (US); Derek M. Berg, Old Orchard Beach, ME (US)

(73) Assignees: Contech Stormwater Solutions, Inc., West Chester, OH (US); I.S.C. Environmental, Inc., Port Orchard, WA (US)

(*) Notice: Subject to any disclaimer, the term of this patent is extended or adjusted under 35 U.S.C. 154(b) by 1072 days.

(21) Appl. No.: 10/968,707

(22) Filed: Oct. 19, 2004

(65) Prior Publication Data

US 2006/0016767 A1    Jan. 26, 2006

Related U.S. Application Data

(60) Provisional application No. 60/590,776, filed on Jul. 23, 2004.

(51) Int. Cl.
*B01D 37/00* (2006.01)
*B01D 35/027* (2006.01)
*B01D 35/16* (2006.01)
*B01D 24/16* (2006.01)
*E03F 5/16* (2006.01)

(52) U.S. Cl. ............... 210/767; 210/747; 210/807; 210/162; 210/170.03; 210/232; 210/282; 210/237; 210/291; 210/323.2; 210/248; 210/434; 210/484; 210/502.1; 210/512.1; 210/532.1; 210/788

(58) Field of Classification Search ............... None
See application file for complete search history.

(56) References Cited

U.S. PATENT DOCUMENTS 342,151 A    5/1886    Walls (Continued)

FOREIGN PATENT DOCUMENTS

EP    0124888    5/1984

(Continued)

OTHER PUBLICATIONS

Advertisement for Upward-Flow Stormwater Treatement of I.S.C. Environmental, Inc., Stormwater, Jul./Aug. 2003, 1 page, p. 52.

(Continued)

*Primary Examiner*—Robert James Popovics
(74) *Attorney, Agent, or Firm*—Thompson Hine LLP

(57) ABSTRACT

A system and related method for separating floating and nonfloating particulate and entrained, suspended, and/or dissolved contaminants from a fluid. The system includes a tank with a lower chamber spaced from an outlet or upper chamber by a confinement deck. The deck includes one or more sockets for receiving one or more filter units for fluid treatment. In addition, the lower chamber of the tank acts as a pretreatment sump to remove floating and nonfloating particulates, thereby reducing the load on the filter units. The filter units are configured for radial and/or upward flow of the fluid from the lower chamber. The filter units may include one or more filter media through which the fluid pass prior to exiting the tank. The filter units include a removable screening retainer for retaining the filter media and/or to screen relatively large contaminants. The filter unit may be removed for ease of tank maintenance and replacement of filter media. The system allows a method of contaminated fluid treatment under varying flow conditions by directing the fluid radially and/or upwardly through the retainer. Establishing both types of flow through the filter unit improves filtering and extends filter life without compromising desired flow through rates.

18 Claims, 17 Drawing Sheets

U.S. PATENT DOCUMENTS

| | | | |
|---|---|---|---|
| 395,291 A | 12/1888 | Muller | |
| 556,725 A | 3/1896 | Farwell | |
| 598,191 A | 2/1898 | Wilcox | |
| 627,729 A | 6/1899 | Gudeman | |
| 809,201 A | 1/1906 | Lutz | |
| 838,129 A | 12/1906 | Mikolasek | |
| 1,371,110 A | 3/1921 | Pelphrey | |
| 1,940,316 A | 12/1933 | McKinley | |
| 2,041,366 A * | 5/1936 | Moran et al. | 210/411 |
| 2,063,086 A * | 12/1936 | Fitz Gerald | 210/282 |
| 2,364,240 A | 12/1944 | Parry | |
| 2,371,444 A | 3/1945 | Hubert | |
| 2,381,627 A | 8/1945 | Thompson | |
| 2,392,901 A | 1/1946 | Brown | |
| 2,577,169 A | 12/1951 | Von Pentz | |
| 2,609,932 A | 9/1952 | Fricke | |
| 2,785,803 A | 3/1957 | Young | |
| 2,862,622 A * | 12/1958 | Jones et al. | 210/333.01 |
| 3,027,910 A | 4/1962 | Oliver | |
| 3,064,819 A | 11/1962 | Jones | |
| 3,233,737 A | 2/1966 | Hultgren | |
| 3,281,144 A | 10/1966 | Turner et al. | |
| 3,306,448 A | 2/1967 | Baker | |
| 3,344,925 A | 10/1967 | Graham | |
| 3,385,444 A | 5/1968 | Dufournet | |
| 3,513,638 A * | 5/1970 | Young | 96/427 |
| 3,522,013 A | 7/1970 | Borgeson | |
| 3,524,548 A * | 8/1970 | McDonald et al. | 210/153 |
| 3,601,392 A | 8/1971 | Spear, Jr. | |
| 3,674,687 A | 7/1972 | Quase | |
| 3,741,393 A | 6/1973 | Estes et al. | |
| 3,747,765 A * | 7/1973 | Nowak | 210/238 |
| 3,815,748 A * | 6/1974 | Johannessen | 210/163 |
| 3,839,850 A * | 10/1974 | Jamiol | 55/341.1 |
| 3,950,252 A | 4/1976 | Jordan et al. | |
| 4,022,693 A * | 5/1977 | Morgan, Jr. | 210/345 |
| 4,032,457 A | 6/1977 | Matchett | |
| 4,064,049 A | 12/1977 | Calvano | |
| RE29,996 E | 5/1979 | Jordan et al. | |
| 4,157,959 A | 6/1979 | Wen et al. | |
| 4,162,976 A | 7/1979 | Monson | |
| 4,243,533 A * | 1/1981 | Savolainen et al. | 210/247 |
| 4,261,823 A * | 4/1981 | Gallagher et al. | 210/164 |
| 4,264,345 A * | 4/1981 | Miller | 55/341.1 |
| 4,322,293 A * | 3/1982 | Morgan, Jr. | 210/232 |
| 4,334,900 A * | 6/1982 | Neumann | 55/350.1 |
| 4,356,010 A * | 10/1982 | Meyer zu Riemsloh | 55/302 |
| 4,364,825 A | 12/1982 | Connor, Jr. | |
| 4,377,397 A | 3/1983 | Clements | 95/286 |
| 4,398,931 A * | 8/1983 | Shevlin | 55/341.1 |
| 4,411,791 A | 10/1983 | Ward | |
| 4,436,621 A * | 3/1984 | Picker | 210/232 |
| 4,436,633 A * | 3/1984 | Robinsky et al. | 210/791 |
| 4,461,707 A * | 7/1984 | Thayer et al. | 210/321.79 |
| 4,522,717 A * | 6/1985 | Brust | 210/238 |
| 4,526,689 A | 7/1985 | Morgan | 210/323.2 |
| 4,552,661 A * | 11/1985 | Morgan | 210/232 |
| 4,624,789 A | 11/1986 | Fan et al. | |
| 4,643,836 A | 2/1987 | Schmid | |
| 4,664,798 A * | 5/1987 | Bergh | 210/241 |
| 4,713,174 A * | 12/1987 | Zievers et al. | 210/233 |
| 4,735,638 A * | 4/1988 | Ciliberti et al. | 55/302 |
| 4,740,221 A * | 4/1988 | Howeth | 55/302 |
| 4,976,873 A | 12/1990 | Ross | |
| 4,997,561 A | 3/1991 | Schutz | |
| 5,133,619 A | 7/1992 | Murfae et al. | |
| 5,223,154 A | 6/1993 | MacPherson, Jr. et al. | |
| 5,248,415 A | 9/1993 | Masuda et al. | |
| 5,252,230 A | 10/1993 | Dunkers | |
| 5,294,337 A | 3/1994 | Johnson | |
| 5,296,293 A | 3/1994 | Jobst | |
| 5,297,367 A | 3/1994 | Sainz | |
| 5,316,589 A | 5/1994 | Krieger, Jr. | |
| 5,322,629 A | 6/1994 | Stewart | |
| 5,330,651 A | 7/1994 | Robertson et al. | |
| 5,391,295 A | 2/1995 | Wilcox et al. | |
| 5,419,838 A | 5/1995 | DiTullio | |
| 5,433,845 A | 7/1995 | Greene et al. | |
| 5,437,786 A | 8/1995 | Horsley et al. | |
| 5,498,331 A * | 3/1996 | Monteith | 210/170.03 |
| 5,511,904 A | 4/1996 | Van Egmond | |
| 5,518,609 A * | 5/1996 | Karlsson | 210/97 |
| 5,536,420 A * | 7/1996 | Oyzboyd | 210/804 |
| 5,549,817 A | 8/1996 | Horsley et al. | |
| 5,562,819 A | 10/1996 | Turner, Jr. et al. | |
| 5,573,349 A | 11/1996 | Paoluccio | |
| 5,624,552 A | 4/1997 | Vales et al. | |
| 5,624,576 A | 4/1997 | Lenhart et al. | |
| 5,667,689 A * | 9/1997 | Graves | 210/621 |
| 5,683,577 A * | 11/1997 | Nurse, Jr. | 210/170.01 |
| 5,693,224 A * | 12/1997 | Fox | 210/202 |
| 5,702,593 A | 12/1997 | Horsley et al. | |
| 5,707,527 A | 1/1998 | Knutson et al. | |
| 5,725,760 A * | 3/1998 | Monteith | 210/170.03 |
| 5,744,048 A * | 4/1998 | Stetler | 210/803 |
| 5,759,415 A * | 6/1998 | Adams | 210/776 |
| 5,770,057 A | 6/1998 | Filion | |
| 5,779,888 A | 7/1998 | Bennett | |
| 5,788,848 A | 8/1998 | Blanche et al. | |
| 5,820,762 A | 10/1998 | Bamer et al. | |
| 5,849,181 A * | 12/1998 | Monteith | 210/163 |
| 5,979,669 A | 11/1999 | Kitajima et al. | |
| 5,996,811 A | 12/1999 | Kitajima et al. | |
| 6,027,639 A | 2/2000 | Lenhart, Jr. et al. | |
| 6,045,699 A | 4/2000 | Yazawa et al. | |
| 6,062,767 A * | 5/2000 | Kizhnerman et al. | 405/39 |
| 6,068,765 A * | 5/2000 | Monteith | 210/170.03 |
| 6,077,423 A | 6/2000 | Roy et al. | |
| 6,077,448 A | 6/2000 | Tran-Quoc-Nam et al. | |
| 6,080,307 A | 6/2000 | Morris et al. | |
| 6,083,402 A | 7/2000 | Butler | |
| 6,086,756 A | 7/2000 | Roy | |
| 6,096,200 A | 8/2000 | Bennett | |
| 6,120,684 A | 9/2000 | Kistner et al. | |
| 6,139,741 A | 10/2000 | McGibbon | |
| 6,155,561 A | 12/2000 | Mandel | |
| 6,171,507 B1 | 1/2001 | Roy et al. | |
| 6,183,633 B1 | 2/2001 | Phillips | |
| 6,187,183 B1 | 2/2001 | Weaver et al. | |
| 6,200,484 B1 * | 3/2001 | McInnis | 210/693 |
| 6,217,757 B1 | 4/2001 | Fleischmann | |
| 6,231,758 B1 | 5/2001 | Morris et al. | |
| 6,241,881 B1 * | 6/2001 | Pezzaniti | 210/155 |
| 6,277,274 B1 | 8/2001 | Coffman | |
| 6,287,459 B1 | 9/2001 | Williamson | |
| 6,328,167 B1 | 12/2001 | Seshimoto et al. | |
| 6,337,025 B1 | 1/2002 | Clemenson | |
| 6,350,374 B1 | 2/2002 | Stever et al. | |
| 6,358,405 B1 | 3/2002 | Leahy | |
| 6,371,690 B1 * | 4/2002 | Monteith | 405/39 |
| 6,379,541 B1 | 4/2002 | Nicholas | |
| 6,406,218 B1 | 6/2002 | Olson | |
| 6,478,954 B1 | 11/2002 | Turner, Jr. et al. | |
| 6,511,595 B2 | 1/2003 | Crompton et al. | |
| 6,533,941 B2 | 3/2003 | Butler | |
| 6,602,408 B1 * | 8/2003 | Berkey | 210/170.09 |
| 6,605,216 B1 | 8/2003 | Lederman | |
| 6,638,424 B2 * | 10/2003 | Stever et al. | 210/170.03 |
| 6,641,729 B1 * | 11/2003 | Sasaki | 210/241 |
| 6,649,048 B2 * | 11/2003 | de Ridder et al. | 210/106 |
| 6,793,811 B1 * | 9/2004 | Fleischmann | 210/163 |
| 6,814,878 B2 * | 11/2004 | Tully | 210/772 |
| 6,869,528 B2 * | 3/2005 | Pank | 210/170.03 |
| 6,886,698 B2 * | 5/2005 | Tully | 210/452 |

| | | | | |
|---|---|---|---|---|
| 6,913,155 B2 * | 7/2005 | Bryant ........................ 210/521 |
| 6,977,040 B2 * | 12/2005 | McCune et al. ............. 210/248 |
| 6,998,038 B2 * | 2/2006 | Howard ....................... 210/111 |
| 7,101,114 B1 * | 9/2006 | Waters, Jr. ................... 405/41 |
| 7,182,856 B2 * | 2/2007 | Pank ............................ 210/97 |
| 7,214,311 B2 * | 5/2007 | Aberle et al. .......... 210/170.03 |
| 7,288,188 B2 * | 10/2007 | Al-Assfour ................. 210/164 |
| 7,294,256 B2 * | 11/2007 | Happel et al. ............... 210/155 |
| 7,419,591 B2 * | 9/2008 | Aberle et al. .......... 210/170.03 |
| 7,485,218 B2 * | 2/2009 | Dussich, I ................... 210/164 |
| 7,494,585 B2 * | 2/2009 | Nino ........................... 210/747 |
| 7,497,234 B2 * | 3/2009 | Robinson ..................... 138/44 |
| 7,517,450 B2 * | 4/2009 | Hersey et al. ............... 210/155 |
| 7,534,344 B2 * | 5/2009 | Williamson et al. .... 210/170.03 |
| 7,638,065 B2 * | 12/2009 | Stever et al. ................ 210/747 |
| 7,638,066 B1 * | 12/2009 | Jacob et al. ................. 210/747 |
| 7,658,857 B2 * | 2/2010 | Wacome ..................... 210/747 |
| 7,666,303 B2 * | 2/2010 | Williams et al. ....... 210/170.03 |
| 7,686,961 B1 * | 3/2010 | Glynne ....................... 210/693 |
| 7,708,149 B2 * | 5/2010 | Pank et al. ............... 210/497.1 |
| 2001/0040124 A1 | 11/2001 | Bennett |
| 2001/0045392 A1 | 11/2001 | Gray et al. |
| 2002/0117435 A1 * | 8/2002 | Pank ........................... 210/170 |
| 2003/0034286 A1 | 2/2003 | Butler |
| 2003/0089652 A1 | 5/2003 | Matsui et al. |
| 2003/0094407 A1 * | 5/2003 | de Ridder et al. ........... 210/120 |
| 2003/0196951 A1 * | 10/2003 | Tully ........................... 210/452 |
| 2004/0026312 A1 * | 2/2004 | Tully ........................... 210/452 |
| 2004/0112807 A1 * | 6/2004 | Aberle et al. ............... 210/120 |
| 2004/0251185 A1 | 12/2004 | Pitt et al. |
| 2005/0040113 A1 | 2/2005 | Howard |
| 2005/0218058 A1 * | 10/2005 | Tully .......................... 210/224 |
| 2006/0016767 A1 * | 1/2006 | Olson et al. ................. 210/767 |
| 2006/0207922 A1 * | 9/2006 | Dussich ...................... 210/164 |
| 2007/0289908 A1 * | 12/2007 | Williamson et al. ..... 210/170.03 |
| 2008/0277326 A1 * | 11/2008 | Hersey et al. .......... 210/170.03 |
| 2008/0277327 A1 * | 11/2008 | Hersey et al. .......... 210/170.03 |
| 2009/0314723 A1 * | 12/2009 | Jacob et al. ................. 210/747 |
| 2010/0051525 A1 * | 3/2010 | Jacob et al. ............ 210/170.03 |

FOREIGN PATENT DOCUMENTS

| | | |
|---|---|---|
| JP | 63104624 | 5/1988 |
| JP | 04313381 | 11/1992 |
| WO | WO 01/89998 | 11/2001 |

OTHER PUBLICATIONS

Screenshot of website page of CDS Technologies, Media Filtration System, (c) 2003, 1 page, printed May 12, 2004.

Olson, Norman L., "Water Quality Treatment Device for Stormwater," Mar. 6, 2003, 29 pp, I.S.C. Environmental, Inc.

International Search Report issued regarding International Application No. PCT/US05/25485 (May 13, 2008).

Written Opinion issued regarding International Application No. PCT/US05/25485 (May 13, 2008).

International Preliminary Report on Patentability, PCT/US2005/025485 (Mar. 3, 2009).

* cited by examiner

FLUID FILTER SYSTEM AND RELATED METHOD

CROSS REFERENCE TO RELATED APPLICATION

The present application claims the priority benefit of U.S. provisional patent application Ser. No. 60/590,776, filed Jul. 23, 2004, entitled "FLUID FILTER SYSTEM AND RELATED METHOD" of the same named inventors. The entire contents of that prior application are incorporated herein by reference.

BACKGROUND OF THE INVENTION

1. Field of the Invention

The present invention relates to systems for filtering contaminants from fluids such as drain water and stormwater. More particularly, the present invention relates to a filter system and related method for removing contaminants from a fluid stream by forcing upward and/or radial flow of the fluid through the filter means.

2. Description of the Prior Art

Fluid transfer systems have been and will remain an important aspect of municipal services and commercial facilities management. The protection of ground water and natural bodies of water requires systems for diverting and/or treating water that contacts roadways, parking lots, and other man made structures. If such diversion or treatment systems are not provided, particulate and contaminants located on or forming part of such structures may be carried by drain water or stormwater to the natural water bodies and contaminate them. Local, state and federal laws and rules require municipalities, businesses, and in some instances, private entities, to establish means to reduce particulate and dissolved pollutant levels permissibly transferred to natural bodies of water from property under their control. Particular requirements may vary from jurisdiction to jurisdiction, but all are likely to become more stringent.

Previously, municipal water transfer and treatment facilities provided the only mechanism for diverting contaminated water away from natural bodies of water, either for holding or treatment for subsequent transfer to natural settings. In general, that process involved, and continues to involve, the establishment of a system of drains, such as in a parking lot or at a street curb, by which water enters a system of pipe conduits. Eventually, the water received from the drains reaches either a final outlet destination or is directed to a treatment system for contaminant removal. For purposes of the description of the present invention, "contaminated water" is to be understood to mean any water including floating particulate, such as Styrofoam™ containers and oil, for example; non-floating particulate, such as sand and silt, for example; and suspended and dissolved contaminants, such as fine solids, oil, grease, organic contaminants including fertilizers, herbicides, and pesticides, and metals, for example.

Land development produces increased quantities of drain water and stormwater runoff, resulting in increased strain on existing water transfer and treatment infrastructure and an increased likelihood of natural water contamination. In an effort to reduce the impact of development on natural resources and municipal services, initial upstream fluid treatment has become a requirement in many land development, restoration and repair projects. That is, requirements in various forms have been established to ensure that before contaminated water enters the municipal water transfer and/or treatment system or a natural body of water, it must be treated in a manner that reduces the level of contaminants entering the municipal system or the natural body of water. Therefore, most new land development plans and upgrades to existing paved surfaces involve the insertion of a preliminary separation system, generally for connection to the municipal water-handling infrastructure. In other cases, the outflow from the separation system may be transferred directly to a natural body of water.

Any preliminary separation system must be designed with the capability to receive fluid flowing in at a wide range of rates. For example, a mild rainfall resulting in rain accumulation of less than 0.25 inches over a span of 24 hours produces a relatively low flow rate through the system. On the other hand, for example, a torrential rainfall resulting in rain accumulation of more than two inches over a span of three hours produces relatively high flow rates through the system. It is desirable, then, to have a separation system capable of handling variable fluid flow rates with reduced likelihood of backup and flooding of the surface above.

In addition to having a reasonable fluid flow throughput capacity, the separation system must be capable of performing the separation function for which it is intended. Relatively large floating particulate and relatively heavy non-floating particulate have been, and are, handled in a number of ways. For example, biofiltration swales, settling ponds, fluid/particle density separators, mechanical separators and media absorbers and filters are employed to remove such types of contaminants. Swales and settling ponds take up significant real estate and are therefore generally not particularly desirable in many settings. The separators require less space to operate, but are relatively costly and require considerable servicing on a regular basis. Existing absorbers and filter mechanisms may be effective at removing specified contaminants; however, they tend to do so at the expense of flow through rates. That is, the filtration efficiency is relatively low in comparison to the required water flow through desired. That may be acceptable under relatively low flow rates; but not so under relatively high flow rates. More efficient systems such as the one described in U.S. Pat. No. 5,759,415 issued to Adams on Jun. 2, 1998, assigned to Vortechnics, Inc. and entitled METHOD AND APPARATUS FOR SEPARATING FLOATING AND NON-FLOATING PARTICULATE FROM RAINWATER DRAINAGE, have been developed and employed to treat water in areas where treatment space is limited. However, regulations regarding the removal of suspended/fine solid particulates and/or dissolved and un-dissolved chemical contaminants have resulted in the need for supplemental removal arrangements.

There is an increasing need and requirement for separation systems associated with drain water and stormwater introduction to municipal water handling systems and natural bodies of water to remove a substantial portion of all forms of contaminants entering the municipal systems or bodies of water at a point closer to the source. However, it is important that the separation systems not be prohibitively expensive in order to ensure that meeting those needs and requirements is feasible. It is also of importance that such separation systems are relatively easy to maintain. It is becoming increasingly important that these separation systems include means for removing suspended solids and/or chemical contaminants, but without sacrificing the other desired characteristics. Fluid filter systems that are configured to allow for loading of the filter by all floating and nonfloating particulates require maintenance over relatively short intervals. In subsequent fluid treatment cycles, contaminants that remain caked-on the filter surface reduce fluid flow through effectiveness and must therefore be removed relatively frequently. In addition, wet, caked filters are very heavy and therefore require the use of assistive equipment, such as cranes, when they are to be removed for maintenance.

Therefore, what is needed is a separation system and related method for removing suspended and/or chemical contaminants from a fluid stream as part of a separation system that may or may not be part of a larger fluid handling system, wherein the separation system is effective in accommodating varied fluid flow rates. What is also needed is such a separation system that is cost effective and configured for ease of maintenance, including, for example, addressing the limitations of contaminant retention on the filter and filter device weight that shorten maintenance cycles and increase maintenance difficulty. Further, what is needed is such a separation system that includes a filter system capable of removing identified contaminants with minimal impact on fluid flow rates.

SUMMARY OF THE INVENTION

It is an object of the present invention to provide a separation system that is effective in accommodating varied fluid flow rates. It is also an object of the present invention to provide such a separation system that conforms or substantially conforms with established contaminant removal requirements. Further, it is an object of the present invention to provide such a separation system that is cost effective and configured for ease of maintenance. In that regard, it is an object of the present invention to maximize contaminant retention within the system while minimizing retention on the surface of the filter and to reduce filter device weight at the time of maintenance activities. The separation system preferably includes a filter system capable of removing identified contaminants with minimal impact on fluid flow rates.

These and other objectives are achieved with the present invention. The invention is a fluid separation system and related method for removing an array of contaminants from a fluid stream with minimal impact on the passage of the fluid stream through the system. The method involves the transfer of contaminated water through the separation system and the separation of contaminants therein. The separation system includes a filter system arranged to remove suspended and/or dissolved contaminants from the fluid stream.

The separation system is preferably established in a treatment chamber having an inlet, an outlet, one or more filter units, and a pretreatment sump referred to herein as a containment chamber. The inlet may be in direct contact with a fluid or it may be connectable to an upstream fluid transfer conduit. The outlet may be in direct contact with a surface water location or it may be connectable to a downstream fluid transfer conduit. If applicable, the upstream fluid transfer conduit and the downstream fluid transfer conduit may be part of a common municipal water handling system. For example, the upstream conduit may be associated with a drain arranged for water on a surface, such as a parking lot surface, to be removed from the surface, and the downstream conduit may form part of the water transfer mechanism designed to divert that water from the drain to a municipal treatment plant or natural surface waters. The separation system of the present invention is designed to remove contaminants from the water before the water reaches the treatment plant or natural surface waters. The containment chamber of the separation system provides a means to remove much or all of the floating and nonfloating particulates from the fluid prior to contacting the filter unit, or alternatively, to allow for sloughing off of some portion of loaded contaminants from the filter unit in a manner that keeps the contaminants away from the filter unit. The filter unit of the present invention is designed for upward and/or radial flow of the fluid into and through the filter unit. That configuration, coupled with the use of the containment chamber, allows sloughing off of bulk contaminants that may be retained thereon when the fluid flow subsides. As a result, the filter unit of the present invention experiences much less contaminant loading over a given period as compared to prior devices that allow for loading of all or substantially all contaminants to the filter system, or that otherwise impose excessive amounts of contaminants on the filter system. As a result, maintenance cycles are lengthened for the separation system of the present invention. The filter unit of the present invention further allows for any filter media contained therein to be released prior to removal of the filter device from the treatment chamber. This allows for simple maintenance without the need for assistive removal equipment.

In one aspect of the invention, a separation system is provided for removing suspended and/or dissolved contaminants from a fluid. As noted, the system includes a tank having an inlet, an outlet, a confinement deck, and a containment chamber below the confinement deck and one or more filters removably retained to the confinement deck, wherein the fluid entering the containment chamber through the inlet passes through the one or more filters to the outlet, and wherein the one or more filters are configured to remove a portion or all of the suspended and/or dissolved contaminants in the fluid prior to the fluid passing through to the outlet. The outlet may be part of an outflow chamber above the confinement deck, wherein fluid exiting the one or more filters enters the outflow chamber before passing to the outlet. The outlet may also simply be any sort of container, port, flow conveyance conduit, siphon conduit, opening, or arrangement in direct or indirect fluid communication with the filter unit discharge(s). The confinement deck may include one or more openings to allow fluid entering the containment chamber under excess flow conditions to bypass the one or more filters and pass to the outlet. The openings may include standpipes extending into the containment chamber and into the outflow chamber. The number of filters employed may be selected as a function of desired flow rate and/or contaminant level and/or content of the fluid passing from the inlet to the outlet. The filters include a retainer with a floor and a perimeter retainer wall, either or both of which may be porous, arranged to define an interior retainer space in fluid communication with the outlet of the filter and arranged to allow fluid to flow through the perimeter wall into the interior retainer space. The retainer may include a porous interior conduit spaced within the interior retainer space and in fluid communication with the outlet. In that arrangement, the retainer may retain one or more filter media within the interior retainer space but not within the interior conduit. The filter media may be releasably retained within the retainer. For example, the retainer floor may have one or more media retention plates hingedly affixed to the perimeter retainer wall. The filter unit may also include a housing containing the retainer therein. When a porous retainer perimeter wall is used, the housing is preferably spaced therefrom to allow fluid to flow therebetween. The filter unit with the housing may be configured for the retainer floor to have one or more media retention plates pivotably hinged to the housing perimeter wall.

In another aspect of the invention a method is provided for treating a fluid to remove suspended and/or dissolved contaminants therefrom to produce a treated fluid having the suspended and/or dissolved contaminants substantially removed. The method includes the steps of directing the fluid to a confinement chamber of a tank where pretreatment occurs, directing the pretreated fluid to one or more filters, wherein the pretreated fluid passes into each of the one or more filters radially and/or upwardly for treatment to produce the treated fluid, and allowing the treated fluid to pass from the one or more filters to an outlet. Additionally, the method may further include the steps of releasably retaining within one or more of the one or more filters one or more filter media. A method is also provided for removing a fluid, filter media, and/or contaminants from a separation system having a tank with a containment chamber separated from and spaced below an outlet by a confinement deck, wherein the confinement deck includes one or more releasably retained filter units, each retaining therein the filter medium and removably retained, either by positioning within filter unit sockets therein, or by connecting to the confinement deck by other means. The method includes the steps of accessing the containment chamber with removal means, removing a portion or all of the fluid, filter media, and/or contaminants contained within the containment chamber, removing the one or more filter units from the confinement deck, accessing the containment chamber through the filter unit sockets and/or any overflow means or port, such as a standpipe, and removing the remainder of the fluid, filter media, and/or contaminants from the containment chamber. The removal method may also include the steps of releasing the filter media from the filter units prior to the step of accessing the containment chamber with the removal means, inserting new filter media into the one or more filter units released from the confinement deck, and re-inserting the filled filter units into the confinement deck sockets after the step of removing the remainder of the fluid, filter media, and/or contaminants from the containment chamber.

These and other features of the invention are set forth in the accompanying drawings and the description below. Other features, objects, and advantages of the invention will be apparent from the description and drawings, and from the appended claims.

DETAILED DESCRIPTION OF THE PREFERRED EMBODIMENTS

Figure 1:
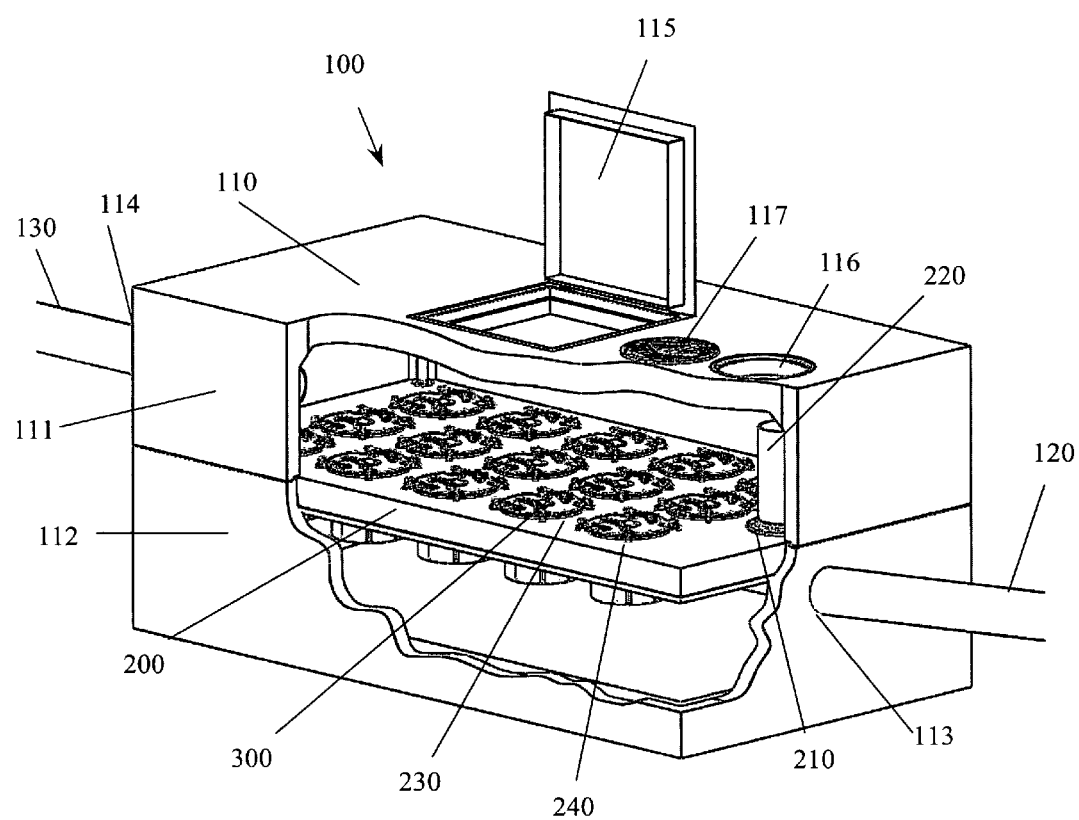
FIG. 1 is a perspective view of the separation system of the present invention, showing a partial cut-away view of the tank to expose the tank interior.
Figure 2:
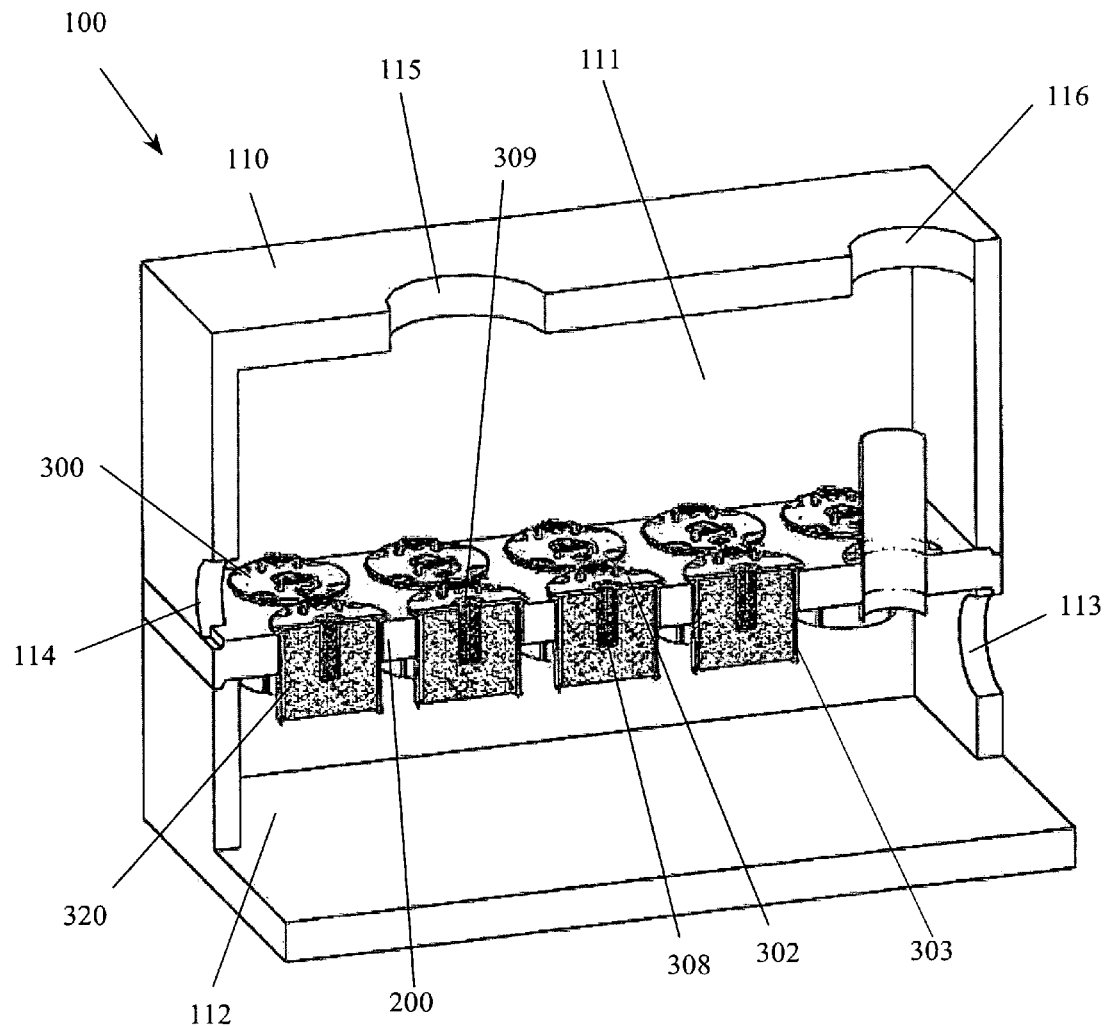
FIG. 2 is a perspective view of the interior of the tank of the separation system showing a partial cut-away view of the confinement deck with filter units.
Figure 3:
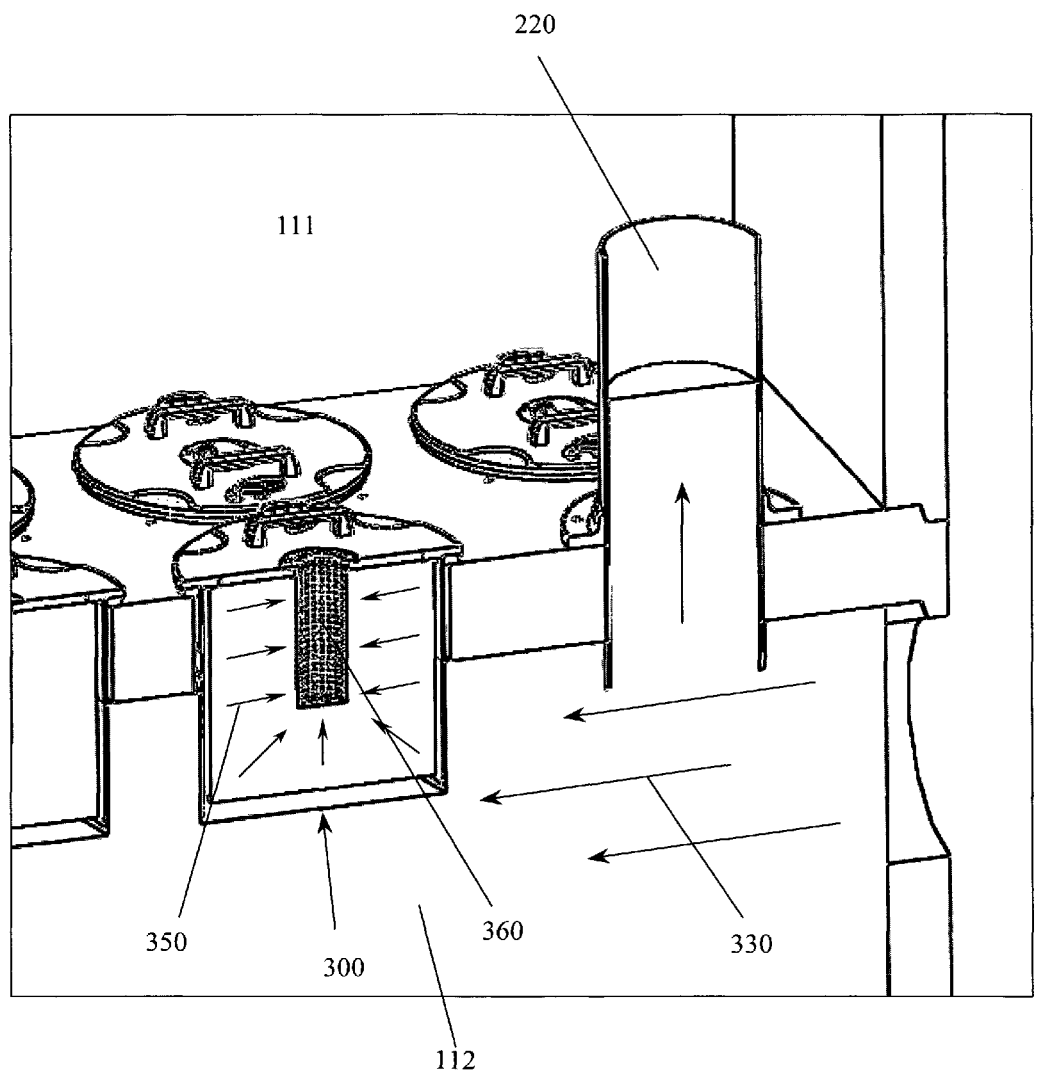
FIG. 3 is a close-up perspective view of the confinement deck of the separation system showing the standpipe and two filter units in partial cross-section.

A separation system 100 of the present invention is illustrated in the accompanying drawings. As shown in FIGS. 1-3, the system 100 includes a tank 110 having an outflow chamber 111 and a containment chamber 112 spaced below the outflow chamber 111 by a confinement deck 200. The containment chamber 112 includes a tank inlet port 113 through which a fluid to be treated enters the containment chamber 112 from an inlet conduit 120. The outflow chamber 111 includes a tank outlet port 114 through which a treated fluid exits the outflow chamber 111 via an outlet conduit 130. The tank 110 also preferably includes an access hatch 115 for accessing the interior of the tank 110 at the outflow chamber 111, and a manhole 116 with cover 117. While the preferred embodiment of the present invention describes the separation system 100 with a specific outflow chamber 111 above the confinement deck 200, it is to be understood that in an alternative embodiment, the fluid may pass from the containment chamber 112 through the one or more filter units to be described herein directly to the outlet conduit 130 or some other form of treated fluid exit means.

The tank 110 is preferably made of concrete but may alternatively be fabricated in whole or in parts of metal, plastic, such as fiberglass, or other suitable materials. It may be rectangular, round, oval or other suitable shape. The inlet conduit 120 may be used to connect the tank 110 to an upstream fluid transfer system. Similarly, the outlet conduit 130 may be used to connect the tank 110 to a downstream fluid transfer system. For example, the upstream fluid transfer system may include a drainage system from a roadway or a parking lot, or a preliminary separation system, and the downstream fluid transfer system may include a municipal water treatment plant or natural or artificial surface waters.

Figure 4:
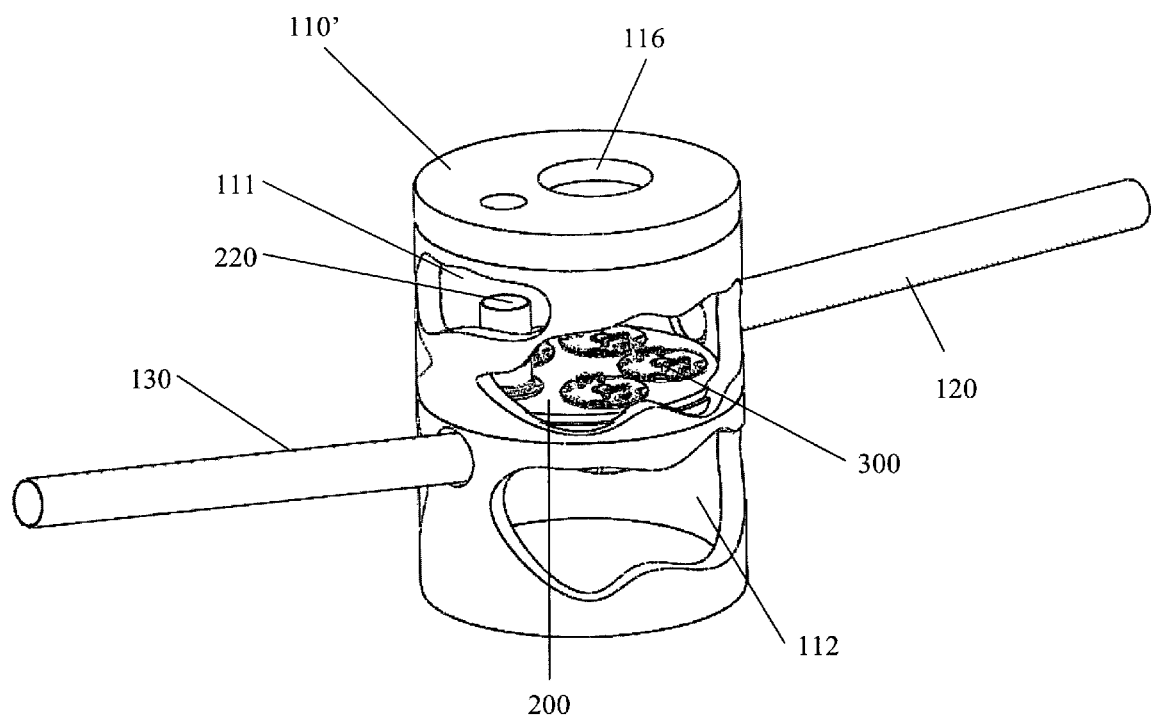
FIG. 4 is a perspective view of a cylindrical version of the tank of the present invention.

With continuing reference to FIGS. 1-3, the confinement deck 200 includes one or more openings 210 that allow for overflow fluid to pass directly from the containment chamber 112 to the outflow chamber 111 under relatively very high fluid flow conditions. Preferably, the one or more openings 210 retain therein a standpipe 220. The standpipe 220 also allows excess untreated fluid to pass directly from the containment chamber 112 to the outflow chamber 111 without being treated, for example when fluid flow rates through the inlet conduit 120 are excessively high. However, the standpipe additionally builds driving head on one or more filter units 300 and preferably extends into the containment chamber 112 far enough to ensure that under such conditions, floating contaminants cannot pass directly from the containment chamber 112 to the outflow chamber 111. The standpipe 220 may also be used as a portal for the removal of fluid and/or particulates from the containment chamber 112 when accessed through the manhole 116. The confinement deck 200 also includes one or more filter sockets 230 for removably retaining in each one thereof a filter unit 300. One or more filter clamps 240 are used for that purpose. In general consideration of the intended operation of the separation system 100, untreated fluid entering containment chamber 112 passes through the one or more filter units 300 where undesirable entrained and/or dissolved matter is filtered out. The treated water then passes out of the filter unit(s) 300 into the outflow chamber 111 from which it exits. While the tank 110 of FIGS. 1-3 is shown to be rectangular in shape, it is to be understood that the tank may be of another shape, such as cylindrical, as shown by tank 110' of FIG. 4. The inlet to a tank such as tank 110' may be arranged to impart a swirling motion of the fluid entering the containment chamber so as to further enhance separation of floating and non-floating matter by directing it to the center of the tank. The advantages of inducing fluid swirl are described in U.S. Pat. No. 5,759,415 issued to Adams on Jun. 2, 1998, assigned to Vortechnics, Inc. and entitled METHOD AND APPARATUS FOR SEPARATING FLOATING AND NON-FLOATING PARTICULATE FROM RAINWATER DRAINAGE. The contents of that patent are incorporated herein by reference.

An important aspect of the present invention is the design of the filter unit 300. With reference to FIGS. 5-11, the filter unit 300 preferably includes a housing 301 with a housing lid 302 and a housing perimeter wall 303. The filter unit 300 further includes a retainer 305 positionable within the housing 301. The retainer 305 includes a retainer perimeter wall 306, a retainer floor 307, and, optionally, a porous interior conduit 308. The housing lid 302 includes a discharge port 309 at the top surface of thereof. The housing 301 optionally includes one or more lifting handles 310 for insertion and removal of the filter unit 300 with respect to the filter socket 230. The housing 301 may be fabricated of any material, but is preferably fabricated of a nonmetallic material, such as plastic. The housing lid 302 may be formed integrally with the housing perimeter wall 303, or it may be removably affixed to the housing perimeter wall 303. The housing 301 is designed to be easily insertable into and removable from the filter socket 230 of the confinement deck 200 for ease of maintenance of the tank 110 as well as the filter unit 300. A gasket 304 may be employed to seal the housing 301 to the confinement deck 200. In an alternative embodiment of the invention, there may be no housing perimeter wall 303, with the retainer 305 simply affixed to the lid 302 and provided with an outlet for passage of treated fluid either to the outflow chamber 111 or some other fluid transfer means. When in position in the socket 230, the housing 301 extends into the containment chamber 112, thereby acting to block floating contaminants from reaching the retainer 305. However, if there is no housing perimeter wall 303, such floating contaminants will be retained by the retainer 305. For purposes of this description, the housing perimeter wall 303 may effectively be the retainer perimeter wall 306 when only up flow of the fluid is desired.

The retainer perimeter wall 306 and the floor 307 define an interior retainer space 319 into which fluid to be treated passes. The interior retainer space 319 is in fluid communication with the outlet 114 of the tank 110. The retainer perimeter wall 306 of the retainer 305 preferably includes an upper retainer wall flange 311 for affixing the perimeter wall 306 to the housing lid 302. For upflow of fluid into the retainer 305, the floor 307 is porous. For radial flow into the retainer, the retainer perimeter wall 306 is porous. In particular, in order to maximize fluid flow conditions, the retainer perimeter wall 306 is porous and is spaced from the interior of the housing perimeter wall 303 to create a space for fluid to enter the housing around the perimeter of the retainer 305 prior to entering it through the retainer perimeter wall 306. If upflow and radial flow are desired, the retainer perimeter wall 306 and the floor 307 are both porous. The porous interior conduit 308 is only required if one or more filter media are employed to remove contaminants. When in use, the porous interior conduit 308 of the retainer 305 includes a conduit mounting flange 312 for affixing the porous interior conduit 308 to the housing lid 302 preferably approximately centered in relative position to the discharge port 309 of the housing lid 302. Thus, in this embodiment of the filter unit 300, the retainer perimeter wall 306 and the interior conduit 308 are not connected together but are instead separately connected to the housing lid 302. The retainer perimeter wall 306, the floor 307, and the interior conduit 308 may be fabricated of metallic or nonmetallic material. When made porous, they may be made as perforated, corrugated, or pleated screening elements, or other configuration as selected by the user.

With continuing reference to FIGS. 5-11, the interior of the housing perimeter wall 303 preferably includes a means for releasably retaining thereto a rotatable release rod 316 that extends through a housing lid hole 315 of the housing lid 302. The means for releasably retaining may be a retaining clip (not shown) to which the release rod 316 may be clipped and allowed to rotate therein. The rotatable release rod 316 terminates at a first end thereof with a release handle 317 adjacent to the housing lid 302, and at an opposing second end thereof in a retention leg 318. The retention leg 318 is designed to fix the retainer floor 307 in a first position when the filter unit 300 is operational, and in a second position when the filter unit 300 is undergoing maintenance. The retention leg 318 may be rotated between the first and second positions by rotating the release handle 317.

As noted, the space defined by the retainer perimeter wall 306, the optional interior conduit 308 if used, and the retainer floor 307 defines the interior retainer space 319 within which one or more filtering media 320 may be located. The one or more filter media may include perlite, zeolite, granular activated carbon, peat, or other suitable filter media selectable as a function of the contaminants to be removed. The filtering media 320 are preferably selected for their effectiveness in removing entrained and/or dissolved matter from the fluid to be treated, but that allow the fluid to pass from the outside of the retainer 305 to the interior of the interior conduit 308 at specified flow conditions. Combinations of different filter media may be employed based on porosity, contaminant affinity, and the like. Such combinations may be mixed or layered, either vertically or horizontally. The porosity of the retainer perimeter wall 306, the retainer floor 307, and the interior conduit 308 must also be designed with both objectives in mind. In some instances, tightly packed filter media and/or relatively small pore sizes for the retainer 305 may be required or desired, whereas in other instances, loosely packed and/or large pore sizes for the retainer 305 may be required. It is to be noted that the retainer 305 may be used without any filter media 320 in those situations where it acts as a gross filtering device for separating relatively large particulates from the fluid prior to entering the outflow chamber 111 (or other form of outlet arrangement). In an arrangement in which there are no filter media 320 used, the interior conduit 308 is not required and the retainer 305 simply includes the retainer perimeter wall 306 and the retainer floor 307. In an arrangement in which the filter media 320 are used in an up flow only system, a top screen may be used to block the filter media 320 from escaping into an exit space 360 prior to discharge, wherein the top screen and exit space 360 effectively act as an interior conduit.

Figure 5:
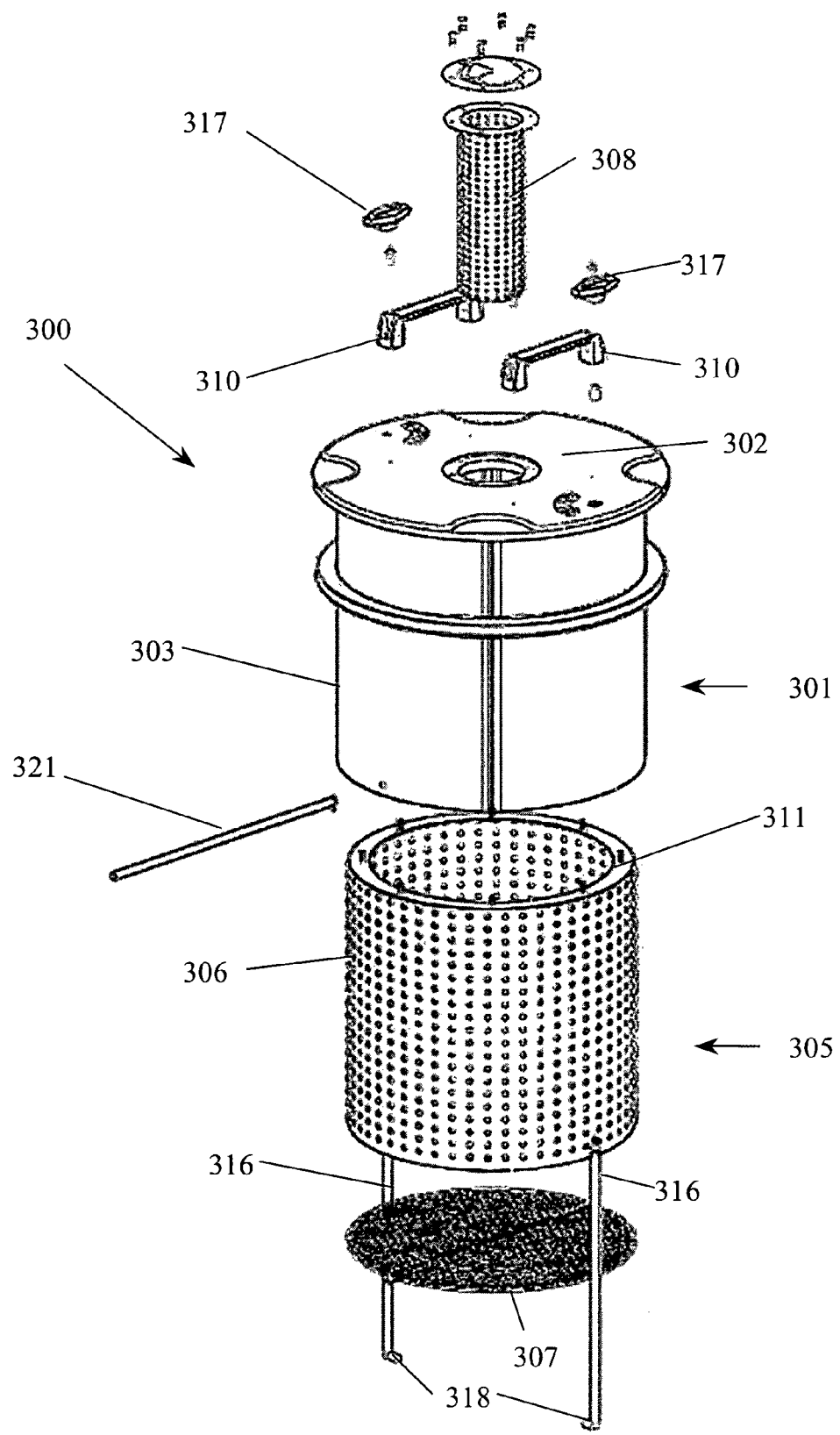
FIG. 5 is an exploded view of the filter unit.
Figure 5A:
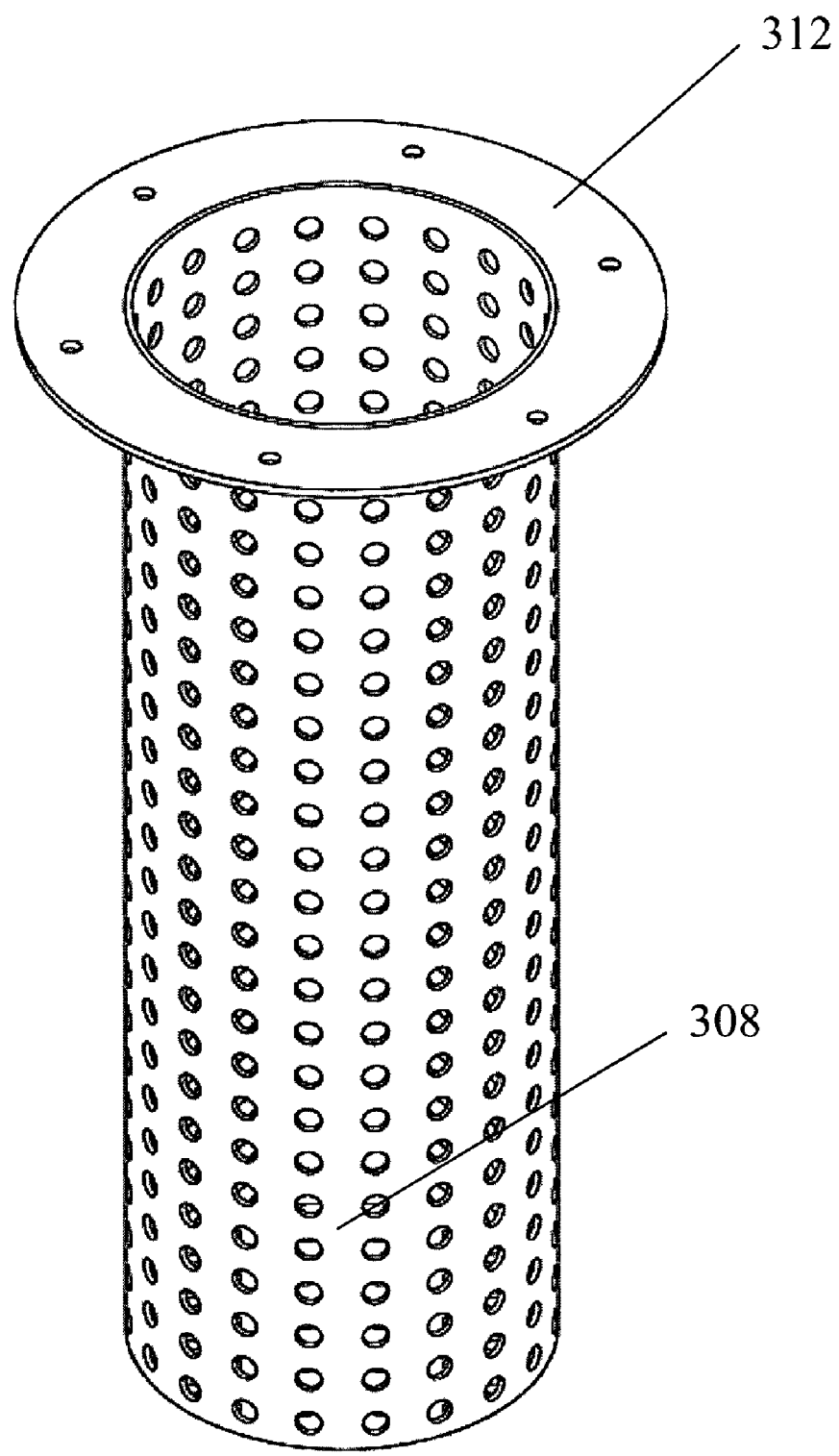
FIG. 5A is a perspective view of the optional porous interior conduit.
Figure 5B:
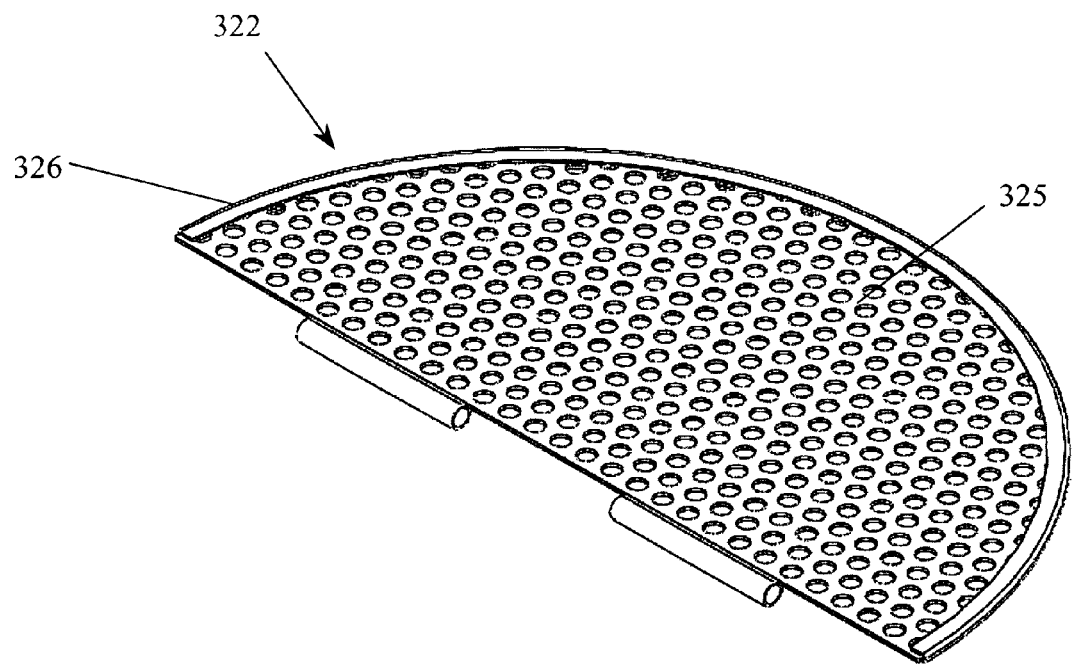
FIG. 5B is a perspective view of a first retainer floor door.
Figure 5C:
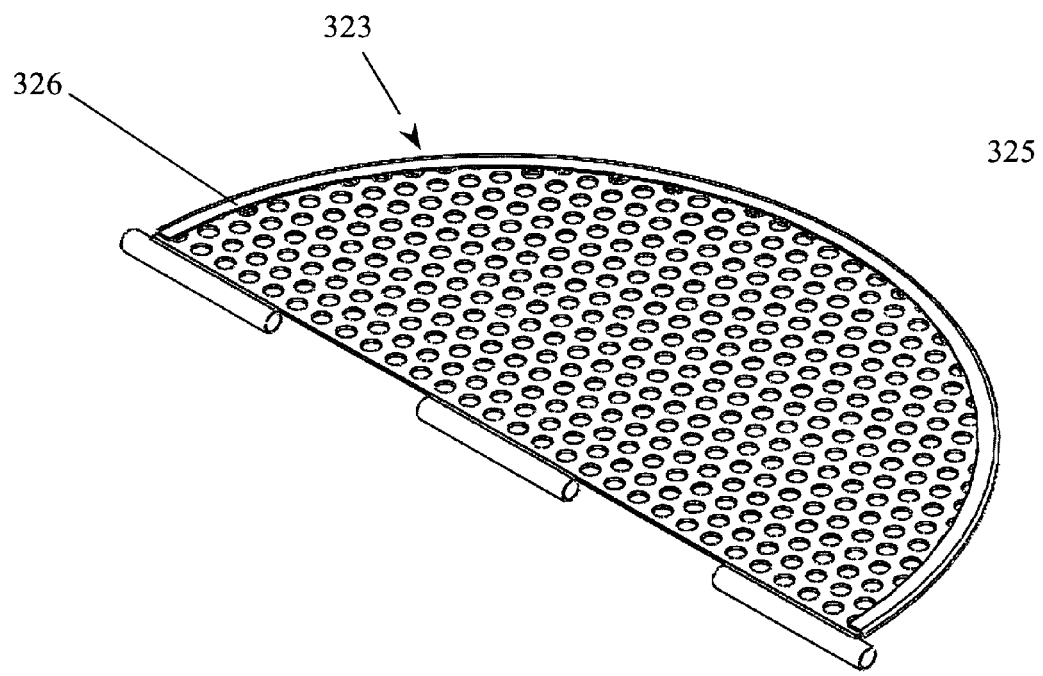
FIG. 5C is a perspective view of a second retainer floor door.
Figure 6:
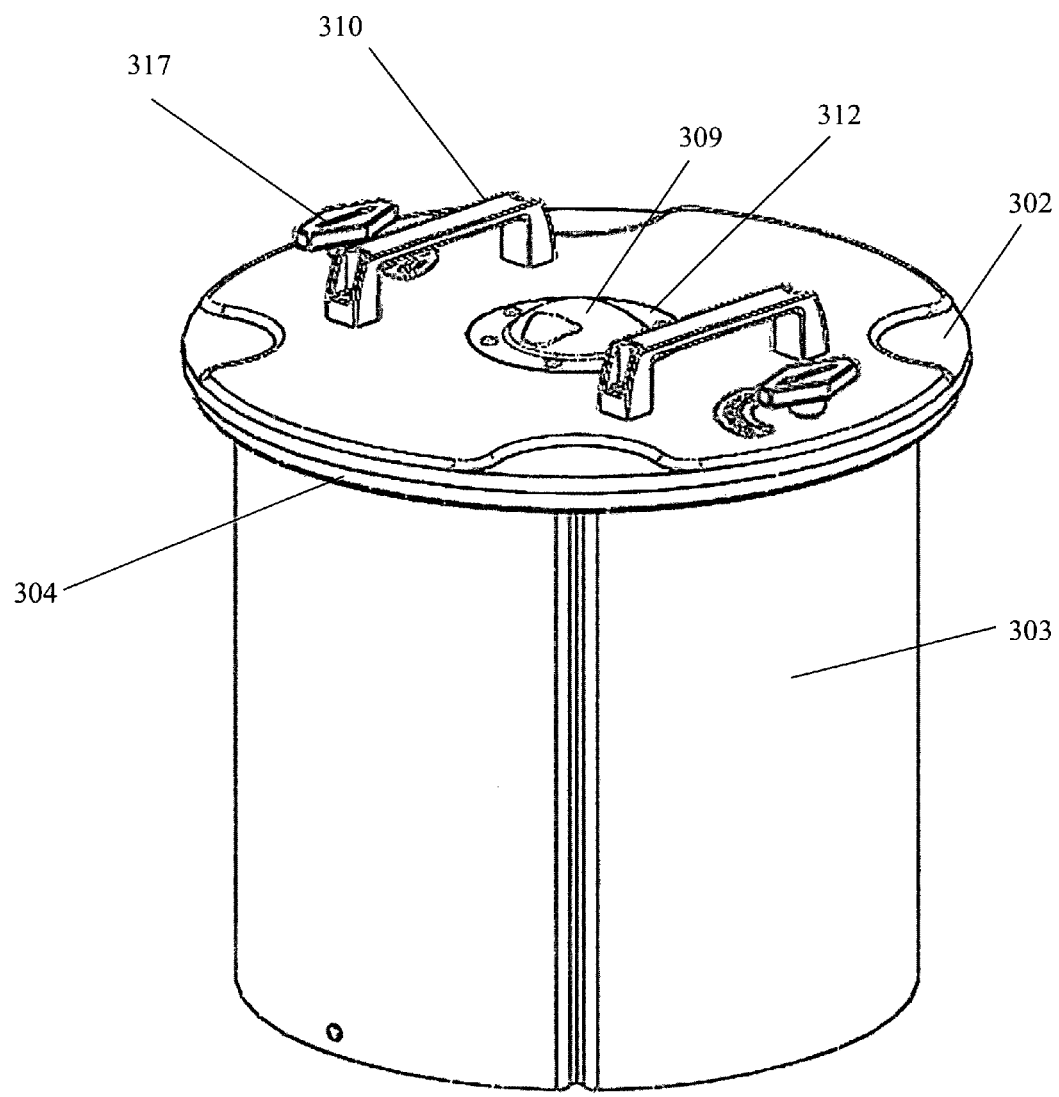
FIG. 6 is a perspective view of the filter unit of the present invention, showing a portion of the exterior of the retainer.
Figure 7:
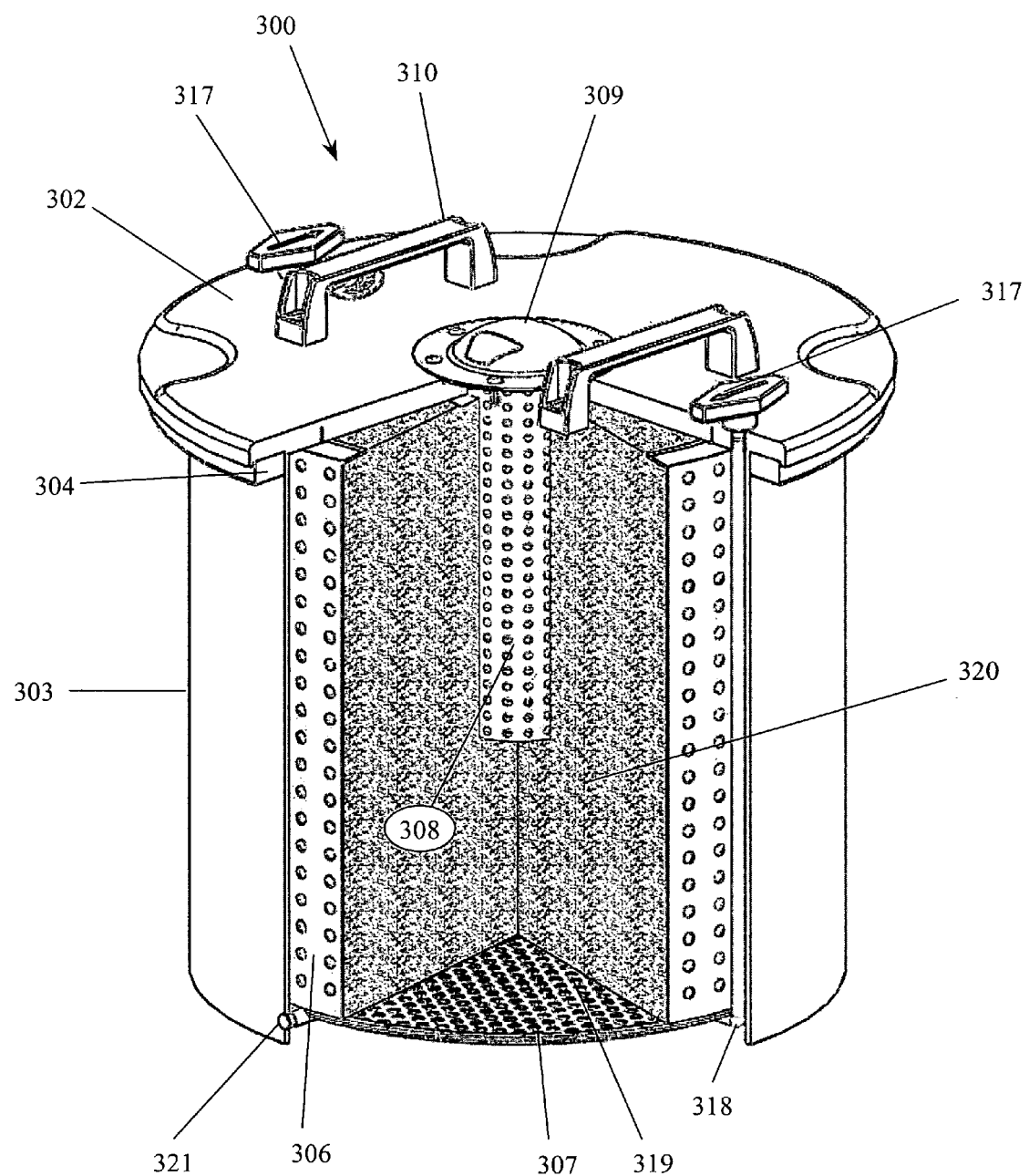
FIG. 7 is a perspective view of the filter unit showing a partial cut-away view of the housing and retainer to show the retainer filled with filter media and showing the interior conduit.

An important aspect of the design of the retainer 305 for the purpose of maintaining the filter unit 300 as well as the system 100 is the arrangement of the retainer floor 307. As shown in FIG. 5, the retainer floor 307 is preferably a hinged structure and more preferably, a center-hinged structure. The retainer floor 307 includes a pivot shaft 321, a first media retention plate 322 hingedly connected to the pivot shaft 321, and a second media retention plate 323 hingedly attached to the pivot shaft 321. Each of media retention plates 322 and 323 includes a perforated or porous body 325 and an optional outer flange 326. The media retention plates 322 and 323 are selected and designed to provide structural support for any filter media to be retained by the retainer 305, and to withstand the hydrostatic pressure to be experienced when the filter unit 300 is in use. The pivot shaft 321 pivots and is retained in openings 328 of the housing perimeter wall 303. The retainer floor 307 may be fabricated of metallic or non-metallic material. In an arrangement where there is no housing 301 but only retainer 305, the media retention plates 322 and 323 may be retained in place by inserting the pivot shaft 321 into opposing holes of the retainer perimeter wall 306. In that arrangement, the release rods 316 and the release handles 317 may be employed to releasably retain the media retention plates 322 and 323 in place until the filter media are to be released. Further, if there are no filter media 320 to be used, the hinged media retention plates 322 and 323 are unnecessary and the retainer floor 307 may be releasably or permanently affixed to the retainer perimeter wall 306.

Figure 8:
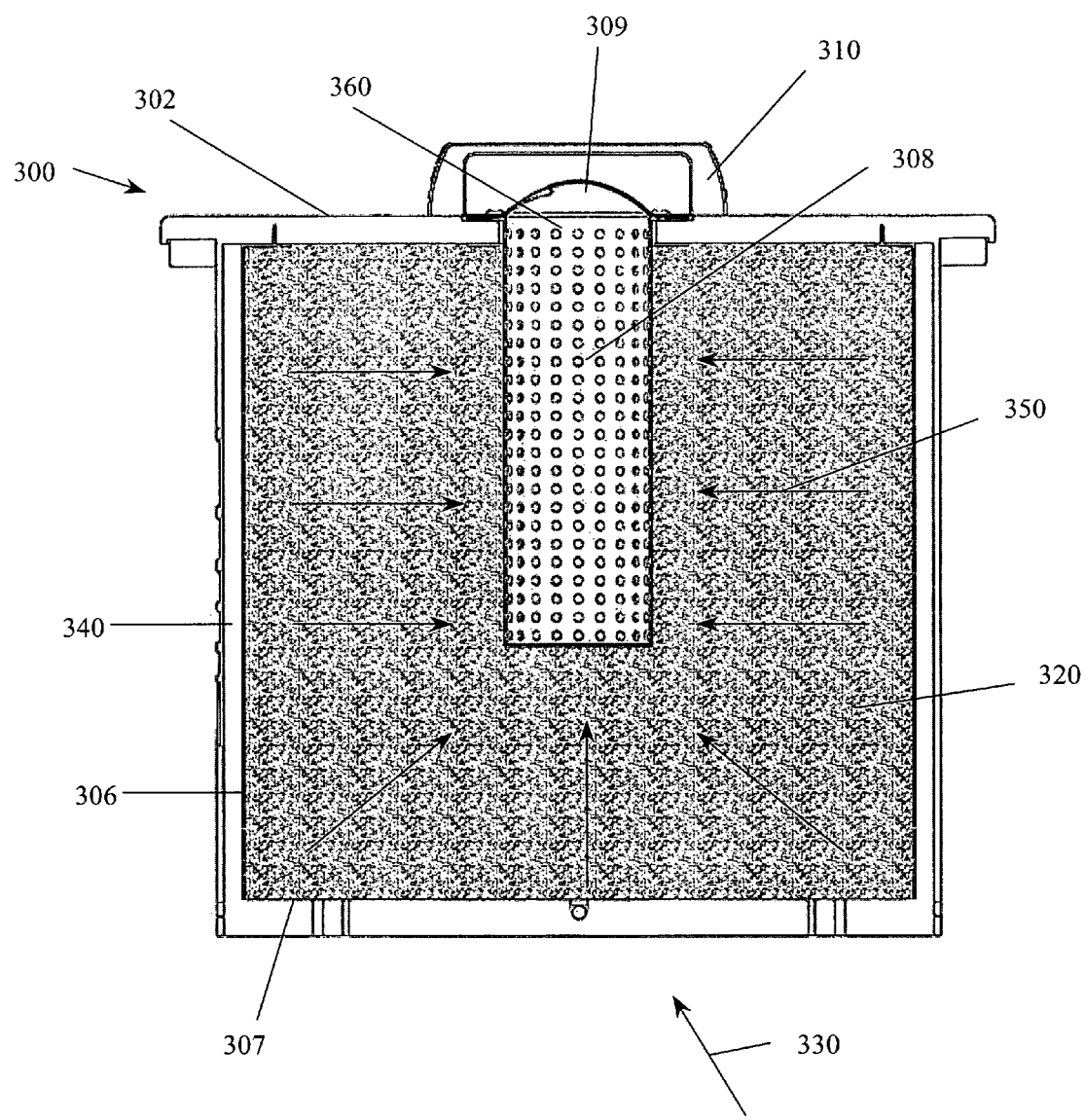
FIG. 8 is a simplified elevation view of a cross-section of the filter unit of the present invention.
Figure 9:
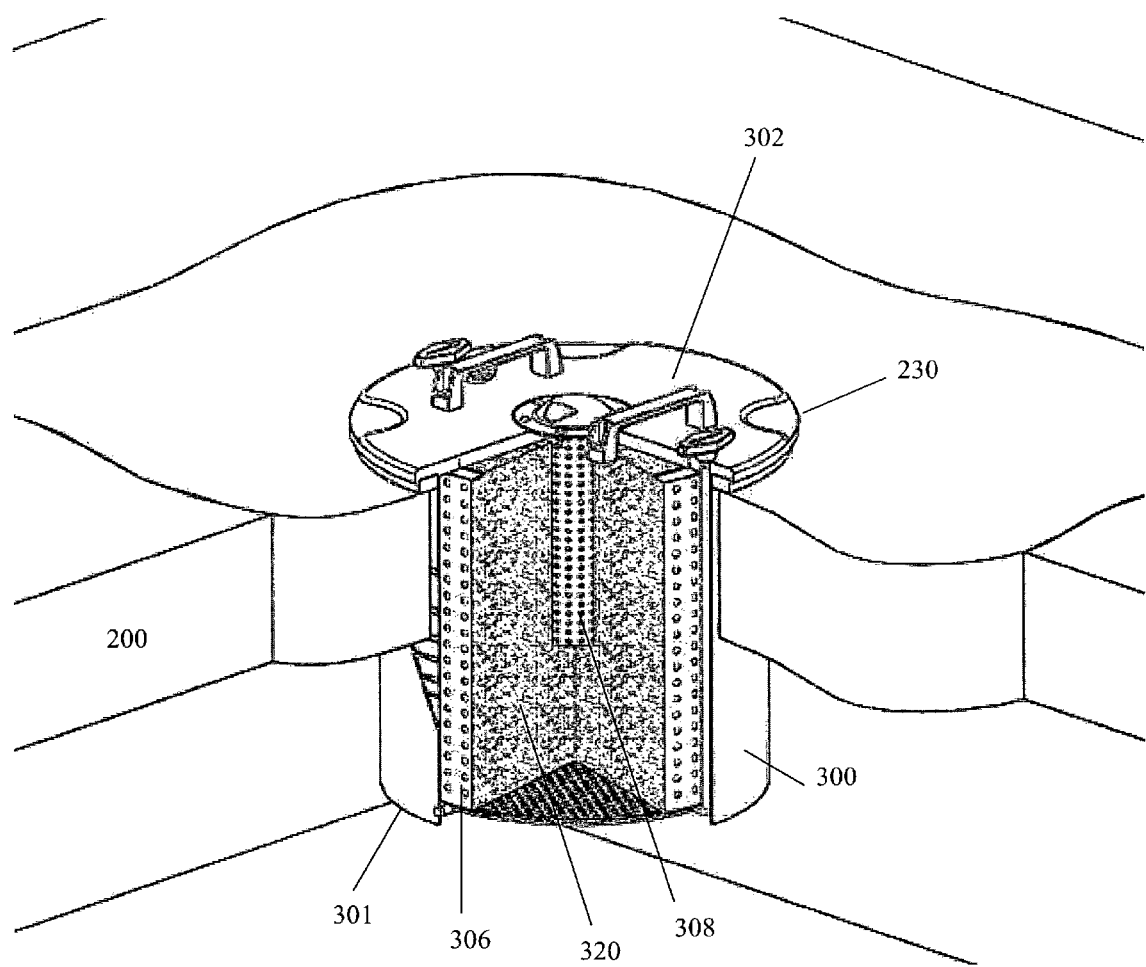
FIG. 9 is a perspective view of the filter unit shown retained in the confinement deck with a partial cut-away view of the housing and retainer.
Figures 10A, 10B:
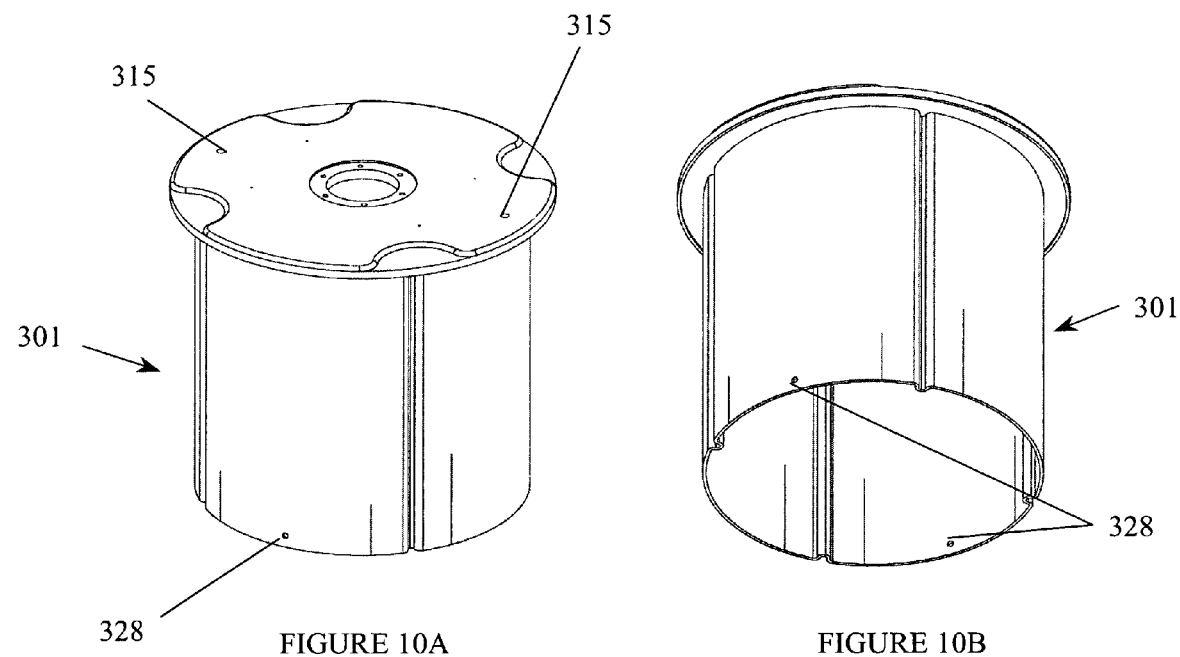
FIG. 10A is a perspective view of the housing from the top.
FIG. 10B is a perspective view of the housing from the bottom.
Figure 11:
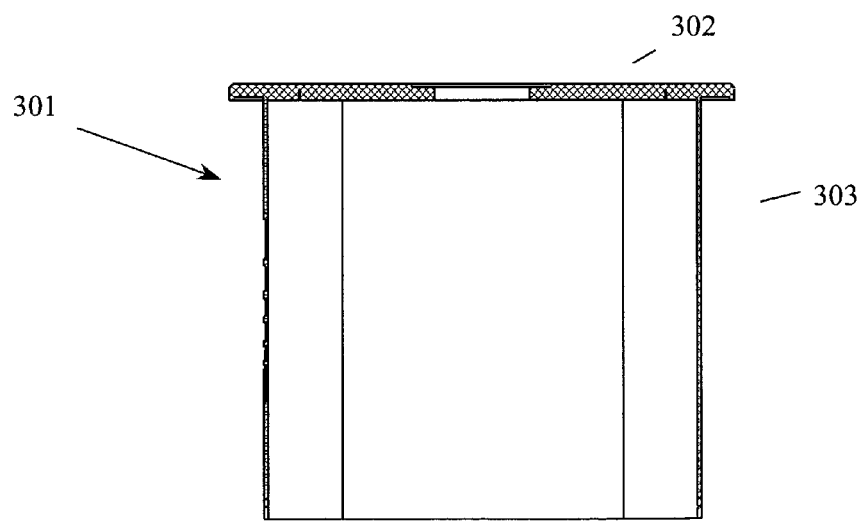
FIG. 11 is a cross sectional view of the housing.
Figure 12:
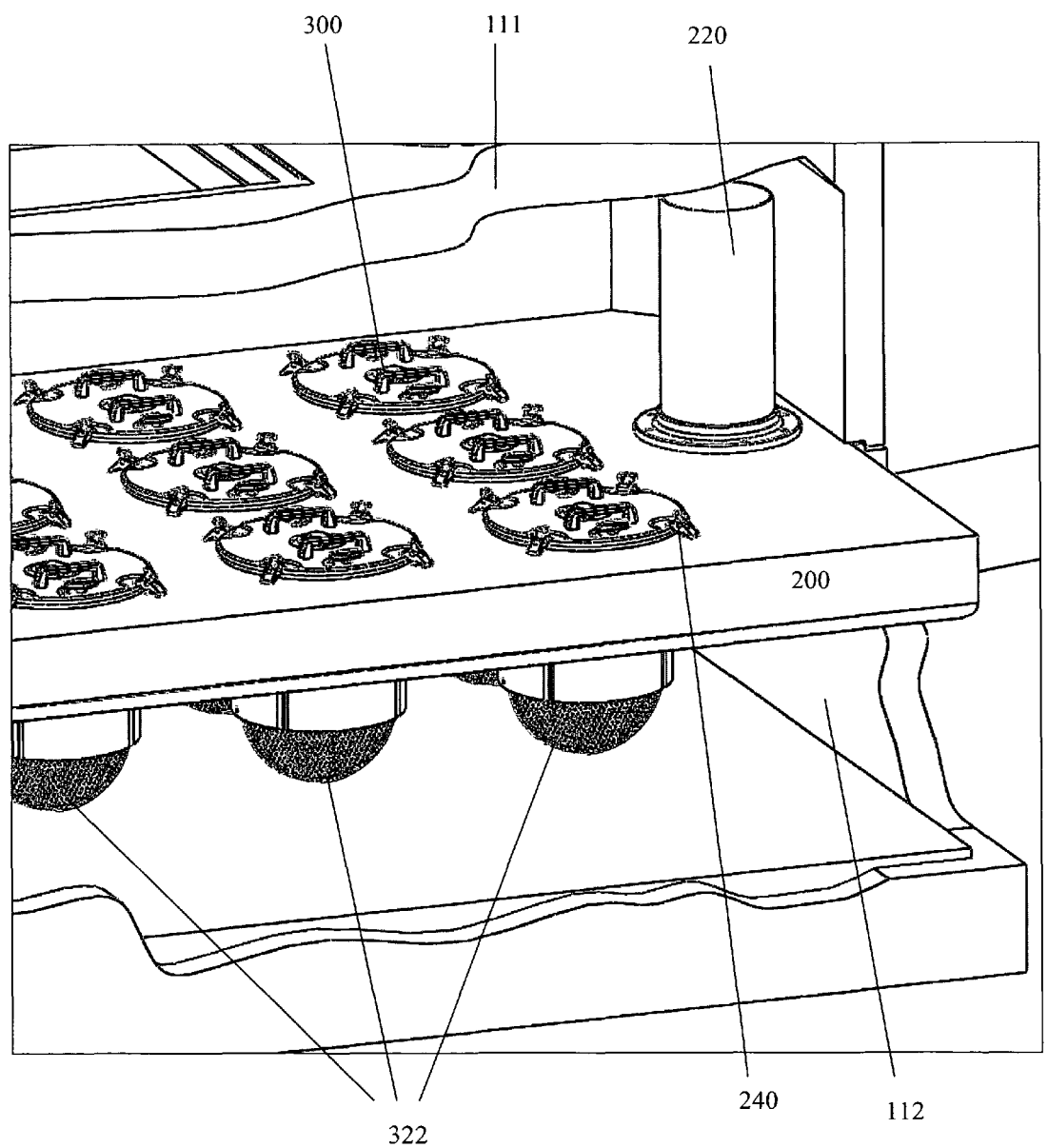
FIG. 12 is a perspective view of a portion of the separation system of the present invention, showing the interior of the tank including the confinement deck and a plurality of filter units with media retention plates open.
Figure 13:
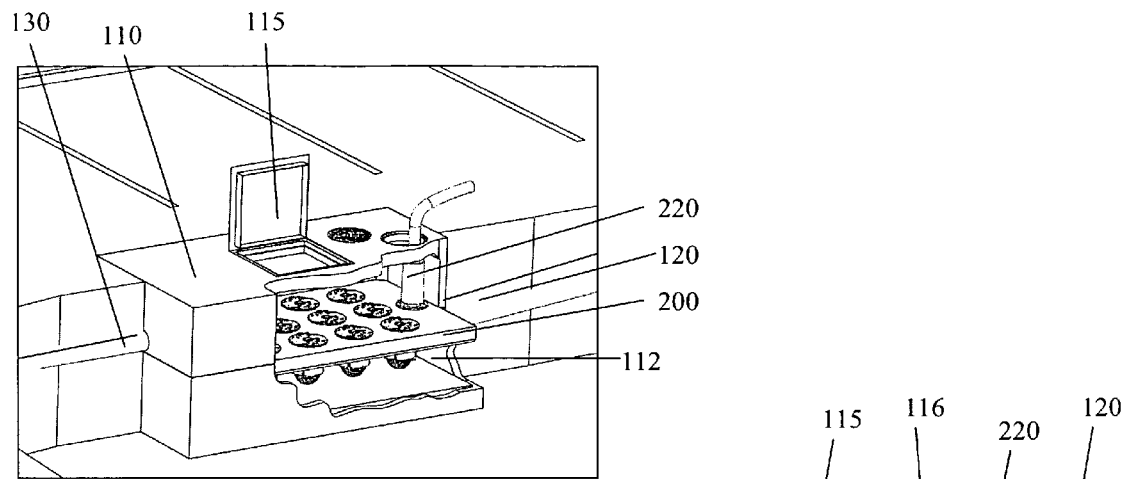
FIG. 13 is a perspective view of the separation system of the present invention, showing a partial cut-away view of the tank to expose the tank interior during filter unit removal from the containment chamber.
Figure 14:
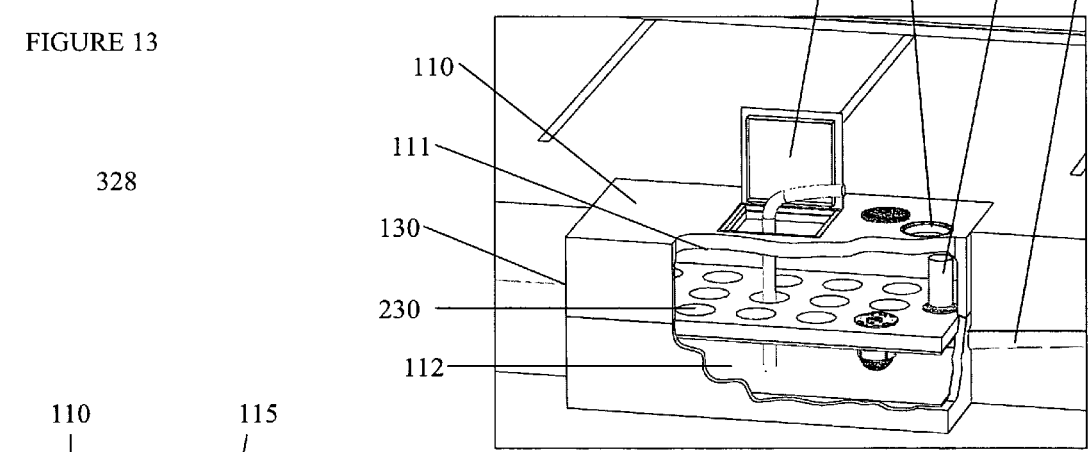
FIG. 14 is a perspective view of the separation system of the present invention, showing a partial cut-away view of the tank to expose the tank interior with filter units removed, and showing the access hatch open for fluid and filter media removal.

In operation, the system 100 enables the removal of undesirable matter from the fluid stream during the fluid's passage from the inlet conduit 120 to the outlet conduit 130. Untreated fluid 330 entering the containment chamber 112 fills that containment chamber 112 and reaches the underside of the filter unit 300 during which time floating and non-floating contaminants are separated from the pretreated fluid reaching the underside of the filter unit 300. This produces hydrostatic pressure on the filter unit 300, thereby forcing the pretreated fluid into the retainer 305. Preferably, floating and non-floating contaminants of relatively large size remain trapped in the containment chamber 112 by the housing 301, the retainer perimeter wall 306, the standpipe 220 or any combination of one or more thereof. As shown in FIGS. 3 and 8, the pretreated fluid 330 enters the housing 301 through the retainer floor 307. As hydrostatic pressure increases on the filter unit 300 with the filling of the containment chamber 112, the pretreated fluid 330 moves into radial flow space 340 between the housing perimeter wall 303 and the retainer perimeter wall 306. The pretreated fluid 330 enters space 319 by way of both the retainer perimeter wall 306 via radial flow space 340 and directly through the perforated body 325 of the retainer floor 307. If there are no filter media 320 in space 319, the fluid-under-treatment 350 passes directly through the space 319 before exiting the discharge port 309 into the outflow chamber 111. It is anticipated that entrained relatively larger particulates will be trapped by either or both of the retainer perimeter wall 306 and the retainer floor 307. If there are filter media 320 in space 319, the fluid-under-treatment 350 dwells in space 319 for trapping entrained, suspended, and/or dissolved contaminants before passing through interior conduit 308 into exit space 360 and exiting the discharge port 309 into the outflow chamber 111. When the pretreated fluid 330 in the containment chamber 112 recedes, contaminants trapped on the exterior of the retainer 305 and/or the housing 301 are more likely to drop back into the containment chamber 112 rather than remain caked on. This enhances the chance of the filter unit 300 remaining sufficiently clear to conduct subsequent filtering operations without the need to halt the fluid transfer process for filter unit 300 maintenance.

As illustrated in FIGS. 12-15, the design of the system 100 of the present invention enables effective treatment of a fluid as well as ease of maintenance of the system 100 itself. The process of maintaining the system 100 when the filter media 320 are in use includes the step of releasing either or both of retainer media retention plates 322 and 323 to allow the filter media 320 to fall into the containment chamber 112. That releasing step may be accomplished by rotating the release handles 317 to the second position to allow the hinged media retention plates 322 and 323 to pivot about the pivot shaft 321. If no filter media are used, this step may be omitted and, in fact, hinged media retention plates 322 and 323 are not required as there is no need to remove filter media 320 therefrom. In the next step, pretreated fluid, trapped contaminants, and any released filter media are removed from the containment chamber 112 using removal means, such as vacuum means, to draw out the pretreated fluid, trapped contaminants, and any released filter media. This removal may be achieved by inserting the removal means into the manhole 116 and through the standpipe 220, or port 210 if there is no standpipe 220. Either while undertaking the removal step or thereafter, the one or more filter units 300 retained to the confinement deck 200 in filter sockets 230 may be removed by releasing filter unit clamps 240, shown in FIGS. 1 and 12, fixed against the housing lid 302 (or by other means of connection to the confinement deck) and removing the filter units 300 from the confinement deck 200, preferably using lifting handles 310. The filter units 300 in situ may be accessed via access hatch 115. This method of removing the filter media 230 from the retainer 305 prior to removing the filter unit 300 substantially reduces the weight of the filter unit 300 to be maintained, thereby allowing such removal without using assistive mechanical equipment, such as a crane.

Figure 15:
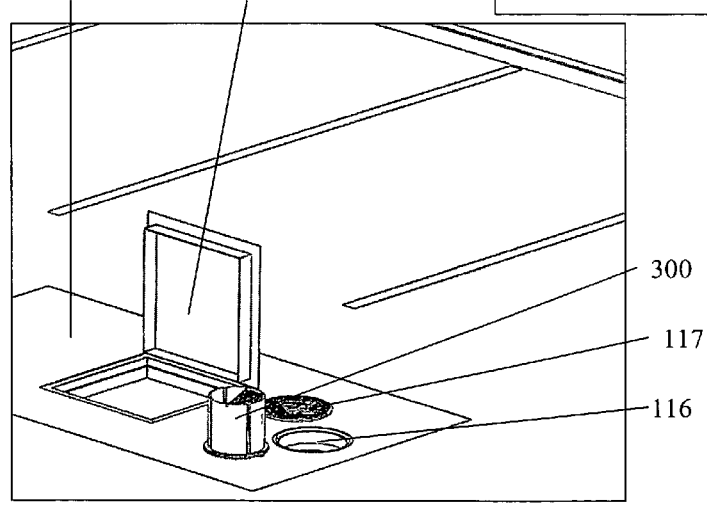
FIG. 15 is an overhead view of the exterior of the separation tank showing a removed filter unit thereon overturned for filter media filling.

Upon removal of the one or more filter units 300 from the confinement deck 200, the same or additional removal means may be used to remove untreated fluid and/or filter media from the containment chamber 112. That additional removal step may be achieved by inserting the removal means into the access hatch 115 and through the one or more sockets 230 to access substantially all of the interior of the containment chamber 112. As shown in FIG. 15, the removed filter unit 300 may be inverted such that it rests on housing lid 302. A new batch of filter media may be inserted into space 319 via either or both of open media retention plates 322 and 323. The door(s) 322 and/or 323 may then be closed by rotating the release handles to the first position to clamp the door(s) 322 and/or 323 into the retained position(s). The filled and closed filter unit(s) may then be re-installed in the confinement deck 200, the access hatch 115 closed, and the system 100 made available for treating the fluid.

Figure 16A:
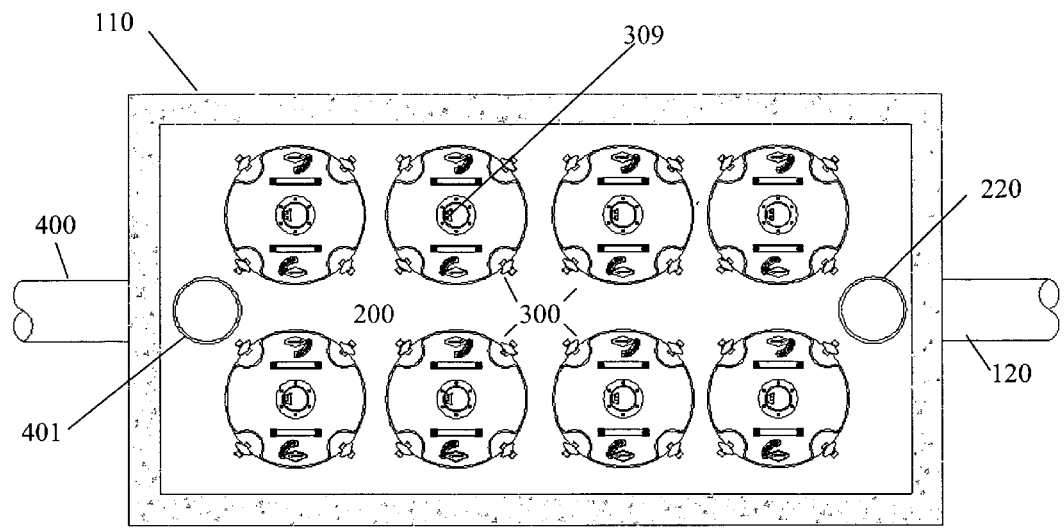
FIG. 16A is a plan view of the separation tank of the present invention showing an alternative containment chamber outlet arrangement.
Figure 16B:
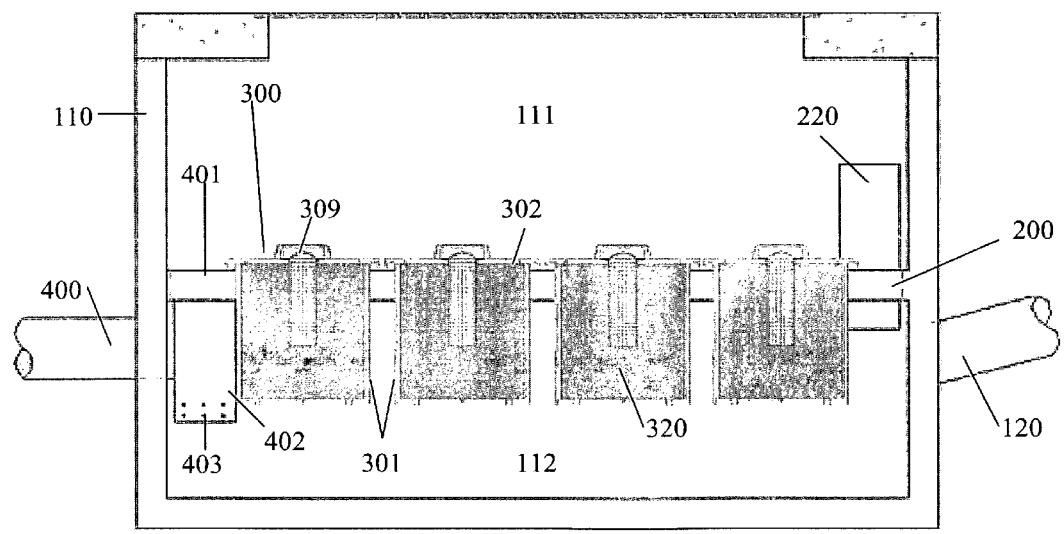
FIG. 16B is an elevation view of the separation tank showing the alternative containment chamber outlet arrangement of FIG. 16A.

An additional optional step of the filter method of the present invention involves draining down the fluid within the containment chamber 112 to keep the filter media 320 relatively dry under low or no flow conditions in the containment chamber 112. For that step, a containment chamber outlet 400 is positioned in the containment chamber 112 as shown in FIGS. 16A and 16B. The containment chamber outlet 400 also acts as the outlet for the outflow chamber 111 via outlet port 401 that provides fluid communication from the outflow chamber 111 to the containment chamber outlet 400 through confinement deck 200, effectively replacing outlet conduit 130. An optional containment chamber downspout 402 may be included in that arrangement to trap floating particulates while allowing fluid to pass from the containment chamber 112 to the outlet 400. Flow control means such as perforations 403 of the downspout 402 enable regulation of the flow of fluid out of the filter unit(s) 300 when flow into the containment chamber 112 subsides. In operation, the system of FIGS. 16A and 16B allows pretreated fluid to flow into the containment chamber 112 as previously described. The standpipe 220 also allows for pretreated fluid under relatively higher flow conditions to bypass the fluid unit(s) 300, also as previously described. However, the outlet 400 in the containment chamber 112 positioned below the underside of the confinement deck 200 ensures that the standing fluid surface in the containment chamber 112 is below the bottom of the filter media 320. If there is a housing 301, the outlet 400 is preferably positioned so that the standing fluid surface is just below the bottom of the filter media 320 but just above the bottom of the housing 301. This arrangement keeps previously separated floatables confined in the containment chamber 112 and away from the filter media 320. Treated fluid passing through the filter unit(s) 300 exit the discharge 309, passes along the upper side of the confinement deck 200, and then drops down into the outlet port 401 to the containment chamber outlet 400 for discharge.

Figure 17:
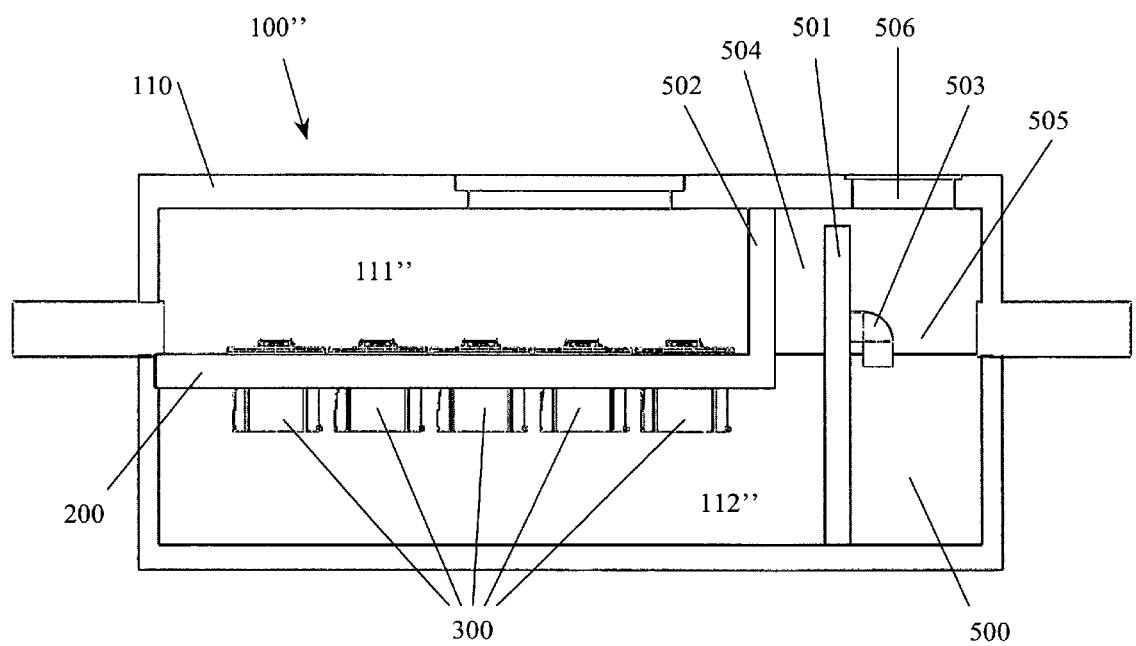
FIG. 17 is an elevation view of an alternative embodiment of the separation tank including a forebay.

Another alternative arrangement of the system 100" shown in FIG. 17 includes a pre-treatment forebay 500 to isolate the tank inlet conduit 120 from the containment chamber 112" when the outlet conduit 130 cannot be positioned above the inlet conduit 120, or when confinement of gross pollutants away from the filter units 300 is desired. In that situation, the forebay 500 is partially spaced from the containment chamber 112" by a baffle 501, and completely isolated from the outflow chamber 111" by tank wall 502. A forebay outlet conduit 503 provides the passageway for fluid entering the forebay 500 to enter the containment chamber 112" via intermediate space 504 that forms part of the containment chamber 112" when the fluid reaches and exceeds the standing fluid level 505. The inlet of the forebay outlet conduit 503 is submerged and sealed to the baffle 501 such that floatables are retained in the forebay 500. Under very high flow conditions, the fluid rises to the level of the top of the baffle 501 and drops over it into the intermediate space 504 without reaching the outflow chamber 111". The baffle 501 also retains floating particulates, at least until the fluid flow rate causes the fluid level in the forebay 500 to exceed the top of the baffle. From there, the untreated fluid is subject to the same filtering process previously described. It is preferred for this arrangement that a forebay manhole 506 be provided directly over the forebay 500 to allow for removal of excess contaminants without directly reaching the containment chamber 112". Although not shown, the tank 110" of system 100" may include a standpipe for bypass, also as previously described.

Figure 18A:
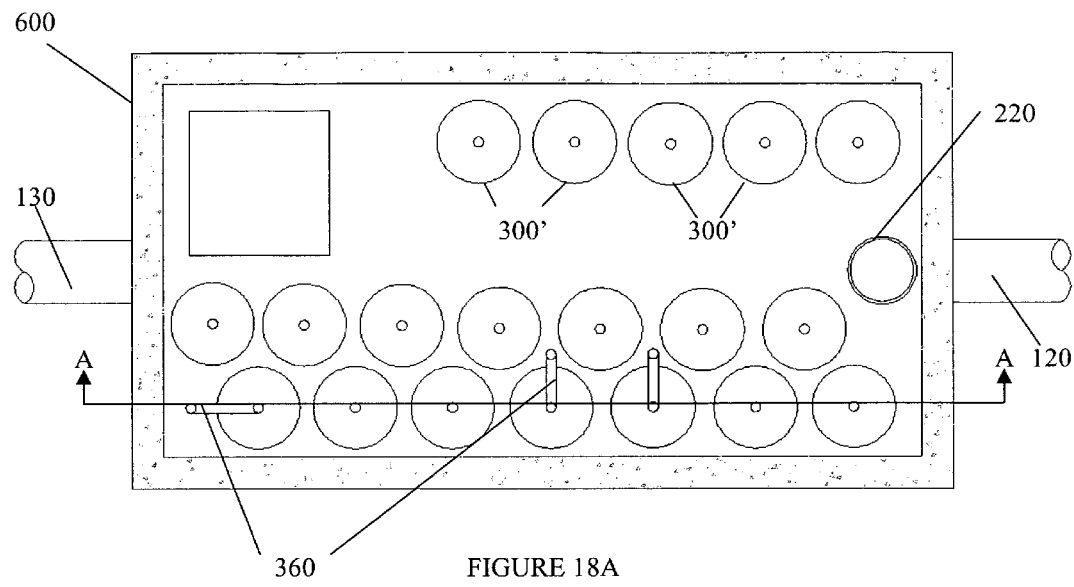
FIG. 18A is a plan view of the separation tank of the present invention showing alternative positioning of the filter units with respect to the confinement deck.
Figure 18B:
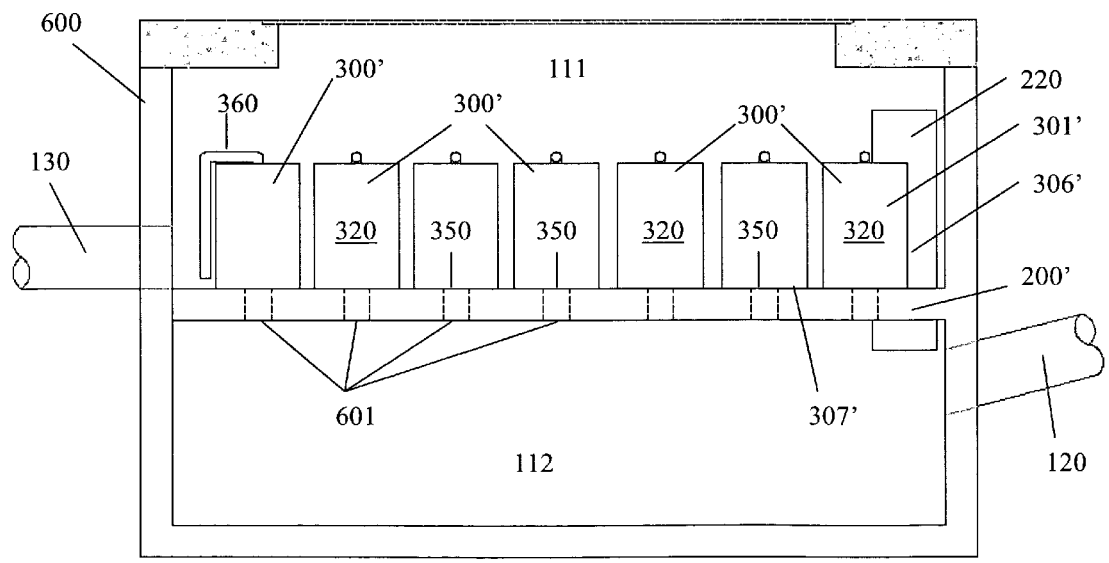
FIG. 18B is a cross-sectional elevation view of the separation tank showing the alternative filter unit positioning of FIG. 18A at section A-A.

An alternative arrangement of the filter units 300' with respect to a modified confinement deck 200' is shown in FIGS. 18A and 18B as part of tank 600. The filter units 300' are positioned substantially in the outlet chamber 111 rather than substantially in the containment chamber 112. Each of the filter units 300' is in fluid communication with pretreated fluid of the containment chamber 112 through a filter port 601. Each filter port 601 is preferably sealed such that pretreated fluid only enters the filter unit 300' therethrough. The filter units 300' include modified housings 301' including a housing perimeter 306' and a housing floor 307'. The housing floor 307' includes a port 350 in fluid communication with the confinement deck port 601 that is configured to ensure that the pretreated fluid entering the filter units 300' is forced to pass into filter area 320 for either or both of upward and radial flow. The filtering of the fluid upon entering the filter unit 300' is achieved in the manner previously described with respect to filter unit 300. The alternative arrangement of tank 600 enables the placement of more filter units 300' in a defined area, it limits wetting of the filter media when the fluid subsides, and the sealing of the filter units 300' with respect to the confinement deck 200' may be easier to achieve. The filter units 300' may include a filter outlet extension 360 to assist in drawing treated fluid out of the filter units 300'.

It is to be understood that the above-described steps are intended to represent primary aspects of the invention and that additional steps may be implemented. Further, the order of the steps illustrated as part of the process is not limited to the order described herein, as the steps may be performed in other orders, and one or more steps may be performed in series or in parallel to one or more other steps, or parts thereof. Additionally, in an alternative embodiment of the filter unit 300, the retainer 305 is the only component of the filter unit 300 that is removable, whereas there is either no housing 301 and the retainer 305 is affixed directly to the confinement deck 200, or the housing 301 is permanently affixed to the confinement deck 200.

While the present invention has been described with particular reference to certain embodiments of the separation system, it is to be understood that it includes all reasonable equivalents thereof as defined by the following appended claims.

What is claimed is:

1. A separation system for removing suspended and/or dissolved contaminants from a fluid, the system comprising:
   a. a tank having an inlet, an outlet, a confinement deck, and a containment chamber below the confinement deck; and
   b. at least one filter removably retained to the confinement deck, wherein the fluid entering the containment chamber through the inlet passes through the at least one filter to the outlet,
   wherein the filter is configured to remove at least a portion of the suspended and/or dissolved contaminants in the fluid prior to the fluid passing through to the outlet;
   wherein the filter includes a retainer with a floor and an upright porous perimeter retainer wall arranged to define an interior retainer space in fluid communication with the outlet, a filter media within the interior retainer space, and the upright porous perimeter retainer wall extends a full height of the retainer space and the filter media therein, and wherein the retainer is arranged to allow fluid to flow through the upright porous perimeter retainer wall into the interior retainer space;
   wherein the floor of the retainer is porous and movable relative to the porous perimeter retainer wall, and the fluid is allowed to flow through both the porous floor and the porous perimeter retainer wall to the interior retainer space;

wherein the retainer further includes a porous interior conduit spaced within the interior retainer space and in fluid communication with the outlet, the filter includes filter media retained within the interior retainer space but not within the interior conduit;

wherein the floor is hingedly affixed to the perimeter retainer wall so as to be movable between a position to contain filter media in the retainer space and a position to allow filter media to drop downward out of the retainer space into the containment chamber.

2. The system as claimed in claim 1 further comprising an outflow chamber above the confinement deck, wherein fluid exiting the filter enters the outflow chamber before passing to the outlet.

3. The system as claimed in claim 1 wherein the filter includes a housing wherein the upright porous retainer perimeter wall is spaced from the housing to allow fluid to flow therebetween.

4. The system as claimed in claim 1 wherein the tank and the inlet are arranged to impart swirling motion to the fluid entering the tank.

5. A separation system for removing suspended and/or dissolved contaminants from a fluid, the system comprising:
   a. a tank having an inlet, an outlet, a confinement deck, and a containment chamber below the confinement deck; and
   b. at least one filter removably retained to the confinement deck, wherein the fluid entering the containment chamber through the inlet passes through the at least one filter to the outlet,
   wherein the filter is configured to remove at least a portion of the suspended and/or dissolved contaminants in the fluid prior to the fluid passing through to the outlet;
   wherein the filter includes a retainer with a floor and an upright porous perimeter retainer wall arranged to define an interior retainer space in fluid communication with the outlet, and wherein the retainer is arranged to allow fluid to flow through the upright porous perimeter retainer wall into the interior retainer space;
   an outflow chamber above the confinement deck, wherein fluid exiting the filter enters the outflow chamber before passing to the outlet; and
   one or more openings through the confinement deck and separate from any filter, wherein the one or more openings enable fluid entering the containment chamber under excess flow conditions to bypass the filter and pass upward through the confinement deck directly to the outflow chamber.

6. The system as claimed in claim 5 further comprising one or more standpipes in the one or more openings, wherein the one or more standpipes extend into the containment chamber and into the outflow chamber.

7. A separation system for removing suspended and/or dissolved contaminants from a fluid, the system comprising:
   a. a tank having an inlet, an outlet, a confinement deck, and a containment chamber below the confinement deck; and
   b. at least one filter removably retained to the confinement deck, wherein the fluid entering the containment chamber through the inlet passes through the filter to the outlet, each filter including a housing and a floor,
   wherein the filter is configured to remove at least a portion of the contaminants in the fluid prior to the fluid passing through to the outlet;
   wherein the floor includes at least first and second media retention plates each of which is pivotably movable between a first position within the housing to contain filter media in the filter and a second position pivoted downward relative to the first position and extending downward below the housing to allow filter media to drop downward out of the filter into the containment chamber.

8. A method for removing a fluid, filter media and/or contaminants from a separation system according to claim 7, wherein filter media is held within the filter, the method comprising the steps of:
   a. releasing the filter media from the bottom of the filter into the containment chamber while the filter remains retained to the confinement deck;
   b. accessing the containment chamber with removal means; and
   c. removing a portion or all of the fluid, filter media, and/or contaminants contained within the containment chamber.

9. The method as claimed in claim 8 further comprising the steps of:
   removing the filter unit from the confinement deck after the releasing step;
   accessing the containment chamber through an opening in the confinement deck that previously held the filter.

10. The method as claimed in claim 9 further comprising the steps of:
    inserting new filter media into the filter removed from the confinement deck; and
    re-installing the filled filter unit into the opening in the confinement deck.

11. A separation system for removing suspended and/or dissolved contaminants from a fluid, the system comprising:
    a. a tank having an inlet, an outlet, a confinement deck, and a containment chamber below the confinement deck; and
    b. at least one filter removably retained to the confinement deck, wherein the fluid entering the containment chamber through the inlet passes through the filter to the outlet, each filter including a floor,
    wherein the filter is configured to remove at least a portion of the contaminants in the fluid prior to the fluid passing through to the outlet;
    wherein the floor includes at least first and second media retention plates each of which is pivotably movable between a position to contain filter media in the filter and a position to allow filter media to drop downward out of the filter into the containment chamber;
    wherein the filter includes first and second retention plate release mechanisms operable from the top of the filter to cause the first and second media retention plates to move from the position to contain filter media in the filter to the position to allow filter media to drop downward out of the filter into the containment chamber.

12. The system as claimed in claim 11 wherein the filter includes a retainer with a perimeter wall that is porous, the floor is part of the retainer and is porous, and the fluid is allowed to flow through the porous floor and the porous perimeter retainer wall to an interior retainer space.

13. The system as claimed in claim 12 wherein the retainer further includes a porous interior conduit spaced within the interior retainer space and in fluid communication with the outlet.

14. The system as claimed in claim 13 wherein the filter includes filter media retained within the interior retainer space but not within the porous interior conduit.

15. A separation system for removing suspended and/or dissolved contaminants from a fluid, the system comprising:
   a. a tank having an inlet, an outlet, a confinement deck, and a containment chamber below the confinement deck; and
   b. at least one filter removably retained to the confinement deck, wherein the fluid entering the containment chamber through the inlet passes through the at least one filter to the outlet,
   wherein the filter is configured to remove at least a portion of the suspended and/or dissolved contaminants in the fluid prior to the fluid passing through to the outlet;
   wherein the filter includes a retainer with a floor and an upright porous perimeter retainer wall arranged to define an interior retainer space in fluid communication with the outlet, and
   wherein the retainer is arranged to allow fluid to flow through the upright porous perimeter retainer wall into the interior retainer space;
   wherein the filter includes a housing and the upright porous retainer perimeter wall is spaced from the housing to allow fluid to flow therebetween; and
   wherein the housing includes a housing perimeter wall and a discharge and the retainer further includes a porous interior conduit spaced within the interior retainer space and in fluid communication with the discharge;
   wherein the filter includes filter media retained within the interior retainer space but not within the porous interior conduit and water passing through the filer media enters the porous interior conduit in order to pass to the discharge, the discharge located at the top of the filter and the porous interior conduit extends downward from the discharge and terminates above a bottom of the filter.

16. The system as claimed in claim 15 wherein the filter media is releasably retained within the retainer.

17. The system as claimed in claim 16 wherein the floor is hingedly affixed to the housing perimeter wall.

18. The system as claimed in claim 17 wherein the floor includes one or more media retention plates pivotably hinged to the housing perimeter wall.

* * * * *